United States Patent
Aoki et al.

(10) Patent No.: US 9,639,314 B2
(45) Date of Patent: May 2, 2017

(54) IMAGE PROCESSING APPARATUS, IMAGE PROCESSING SYSTEM AND RECORDING MEDIUM FOR PRINT JOBS THAT DESIGNATE RENDERING ENGINES

(71) Applicants: Yosuke Aoki, Kanagawa (JP);
Yoshinori Sochi, Tokyo (JP)

(72) Inventors: Yosuke Aoki, Kanagawa (JP);
Yoshinori Sochi, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 14/641,204

(22) Filed: Mar. 6, 2015

(65) Prior Publication Data
US 2015/0261488 A1 Sep. 17, 2015

(30) Foreign Application Priority Data

Mar. 11, 2014 (JP) ................................. 2014-047217
Feb. 24, 2015 (JP) ................................. 2015-033947

(51) Int. Cl.
*G06F 3/12* (2006.01)
*G06K 15/02* (2006.01)

(52) U.S. Cl.
CPC .......... *G06F 3/1275* (2013.01); *G06F 3/1206* (2013.01); *G06F 3/1211* (2013.01); *G06F 3/1247* (2013.01); *G06F 3/1248* (2013.01); *G06F 3/1282* (2013.01); *G06F 3/1298* (2013.01); *G06K 15/1807* (2013.01); *G06K 15/1836* (2013.01); *G06F 3/1245* (2013.01)

(58) Field of Classification Search
CPC combination set(s) only.
See application file for complete search history.

(56) References Cited

U.S. PATENT DOCUMENTS

| 6,825,943 B1 * | 11/2004 | Barry ................ G06K 15/1857 358/1.1 |
| 8,054,494 B2 * | 11/2011 | Takahashi ............ G06F 3/1205 358/1.15 |
| 2006/0146353 A1 * | 7/2006 | Yue ........................ G06F 3/1205 358/1.13 |
| 2006/0215214 A1 * | 9/2006 | Halsema ............... G06F 3/1208 358/1.15 |

(Continued)

FOREIGN PATENT DOCUMENTS

| JP | 2009-271930 | 11/2009 |
| JP | 2012-238188 | 12/2012 |
| JP | 2013-088992 | 5/2013 |

OTHER PUBLICATIONS

Extended European Search report, EPO, issued Aug. 17, 2015, entire document.

*Primary Examiner* — Henok A Shiferaw
(74) *Attorney, Agent, or Firm* — Duft Bornsen & Fettig LLP

(57) ABSTRACT

An information processing apparatus for creating drawing data based on a printing job, comprises a plurality of drawing data creating units configured to create respective drawing data based on the printing job, a printing job receiving unit configured to receive the printing job designating a drawing data creating unit of the drawing data creating units, a printing job outputting unit configured to output the printing job received by the printing job receiving unit to the designated drawing data creating unit.

9 Claims, 22 Drawing Sheets

(56) References Cited

U.S. PATENT DOCUMENTS

2007/0127064 A1* 6/2007 Kuroshima ............ G06F 3/1204
 358/1.15
2009/0279125 A1 11/2009 Liu et al.
2011/0286041 A1* 11/2011 Kuroshima ............ G06F 3/1207
 358/1.15
2012/0287463 A1* 11/2012 Iida ....................... G06F 3/1205
 358/1.15

* cited by examiner

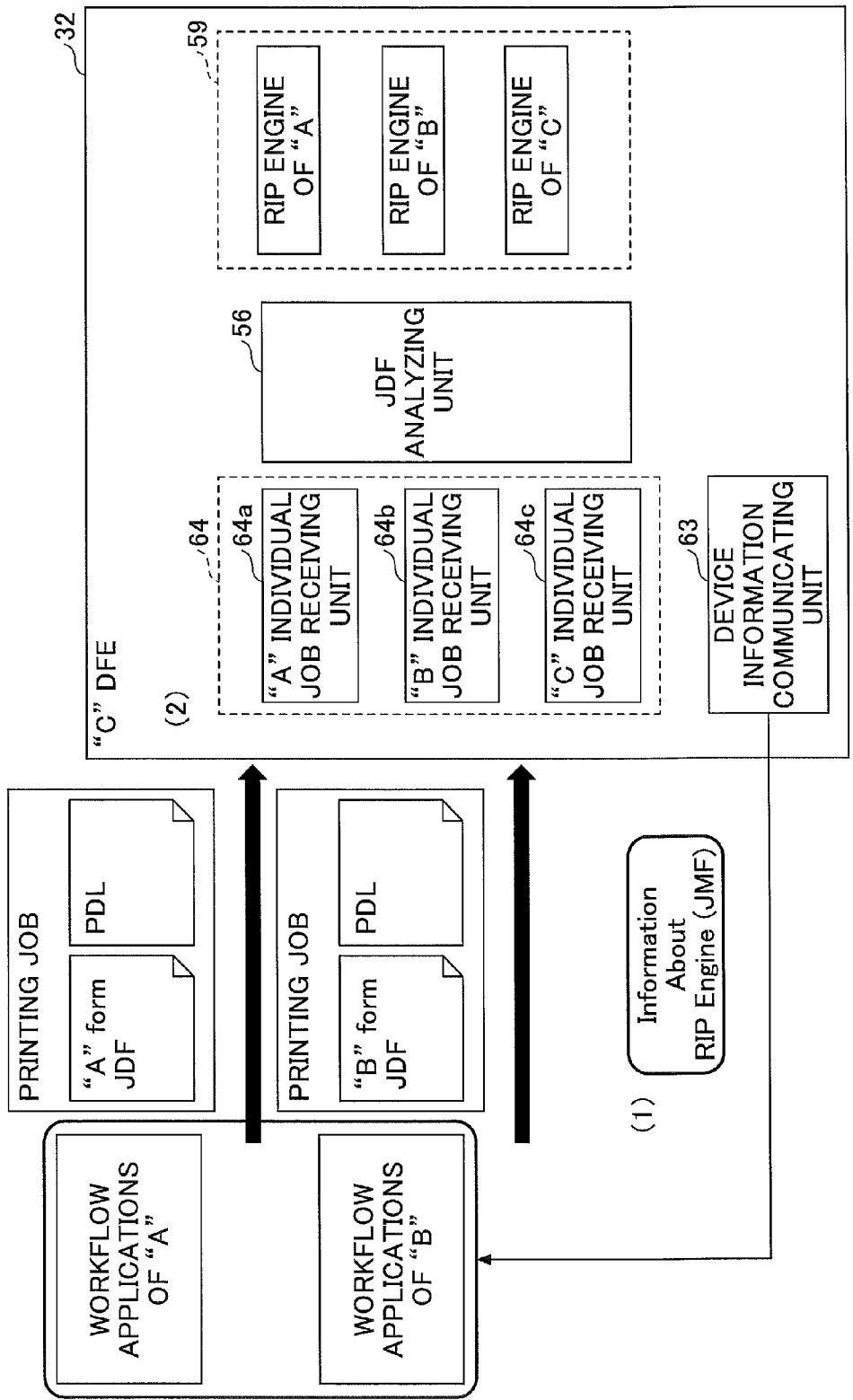

FIG.9A

Query Message

```
1. <JMF DeviceID="DFE" SenderID="Workflow Software A" TimeStamp="2009-10-22T15:53:10-07:00"
       Version="1.4" xmlns="http://www.CIP4.org/JDFSchema_1_1" xmlns:C="www.ccc.com/schema/ccc" >
2.   <Comment Name= "C:ApiVersion">1.1</Comment>
3.   <Query ID="Q1" Type="KnownDevices" />
4. </JMF>
```

FIG.9B

Response Message

```
1.  <?xml version="1.0" encoding="UTF-8"?>
2.  <JMF DeviceID="DFE" SenderID="Workflow Software A" TimeStamp="2009-10-22T15:54:20-07:00"
        Version="1.4" xmlns="http://www.CIP4.org/JDFSchema_1_1" xmlns:C="www.ccc.com/schema/ccc" >
3.    <Comment Name= "C:ApiVersion">1.1</Comment>
4.    <Response ID="R1" Type="KnownDevices" >
5.      <DeviceList>
6.        <DeviceInfo DeviceStatus="Idle" >
7.          <Device DeviceID="DFE" >
8.          ...
9.            <C:VirtualPrinter Name="VirtualPrinterA" >
10.             <RipEngine RipMode="PassThrough|Page" Manufacturer="A" />
11.           </C:VirtualPrinter>
12.           <C:VirtualPrinter Name="VirtualPrinterB" >
13.             <RipEngine RipMode="Sheet" Manufacturer="B" />
14.           </C:VirtualPrinter>
15.           <C:VirtualPrinter Name="VirtualPrinterC" >
16.             <RipEngine RipMode="Page" Manufacturer="C" />
17.           </C:VirtualPrinter>
18.         ...
19.         </Device>
20.       </DeviceInfo>
21.     </DeviceList>
22.   </Response>
23. </JMF>
```

FIG.10

```
1. <JDF xmlns="http://www.CIP4.org/JDFSchema_1_1" xmlns:C="www.ccc.com/schema/ccc" ...>
2.    <ResourcePool>
          :
3.        <InterpetingParams ... ID="IP0" C:Mode="PassThrough" ... />
          :
4.    </ResourcePool>
5. </JDF>
```

+

Information about Individual Job Receiving Unit

```
<JDFxmlns="http://www.CIP4.org/JDFSchema_1_1" xmlns:C="www.ccc.com/schema/ccc" ...>
  ...
  <ResourceLinkPool>
    <ComponentLink ... Amount = "2" ... />
    ...
  </ResourceLinkPool>
  <ResourcePool>
    <LayoutPreparationParams ...  Rotate = "Rotate90" ... >
    ...
    </LayoutPreparationParams>
    ...
  </ResourcePool>
</JDF>
```

FIG.11A

```
<JDFxmlns="http://www.CIP4.org/JDFSchema_1_1" xmlns:A="www.aaa.com/schema/aaa" ...>
  ...
  <ResourceLinkPool>
    <ComponentLink ...  Amount = "2" ... />
    ...
  </ResourceLinkPool>
  <ResourcePool>
    <LayoutPreparationParams ...  A:Rotate = "2" ... >
    ...
    </LayoutPreparationParams>
    ...
  </ResourcePool>
</JDF>
```

```
<JDFxmlns="http://www.CIP4.org/JDFSchema_1_1" xmlns:B="www.bbb.com/schema/bbb" ...>
    ...
<ResourceLinkPool>
    <ComponentLink ... B:DeliveryAmount = "2" ... />
    ...
</ResourceLinkPool>
<ResourcePool>
    <LayoutPreparationParams ...  B:AlternateRotation ="false"  ...   B:Rotate = "1" >
    ...
    </LayoutPreparationParams>
    ...
</ResourcePool>
    ...
</JDF>
```

FIG.12A

| "C" JDF | | Job Attribute in DFE | |
|---|---|---|---|
| NAME OF ATTRIBUTE | VALUE | NAME OF ITEM | VALUE |
| Amount | | Number of Print Copies | |
| | 1~32767 | | 1~32767 |
| Rotate | | Rotation | |
| | Rotate0 | | 0° |
| | Rotate90 | | 90° |
| | Rotate180 | | 180° |
| | Rotate270 | | 270° |
| ... | | ... | |
| | ... | | ... |
| | ... | | ... |

FIG.12B

| "A" JDF | | Job Attribute in DFE | |
|---|---|---|---|
| NAME OF ATTRIBUTE | VALUE | NAME OF ITEM | VALUE |
| A:Amount | | Number of Print Copies | |
| | 1~32767 | | 1~32767 |
| A:Rotate | | Rotation | |
| | 1 | | 0° |
| | 2 | | 90° |
| | 3 | | 180° |
| | 4 | | 270° |
| ... | | ... | |
| | ... | | ... |
| | ... | | ... |

FIG.12C

| "B" JDF | | Job Attribute in DFE | |
|---|---|---|---|
| NAME OF ATTRIBUTE | VALUE | NAME OF ITEM | VALUE |
| B:DeliveryAmount | | Number of Print Copies | |
| | 1~32767 | | 1~32767 |
| B:AlternateRotation | | Rotation | |
| | true | | |
| | false | | |
| B:Rotate | | | |
| | 1 | | 0° |
| | 2 | | 90° |
| | 3 | | 180° |
| | 4 | | 270° |
| ... | | ... | |
| | ... | | ... |
| | ... | | ... |

FIG.14

Job Attribute in DFE

| ITEM | | |
|---|---|---|
| Job Information | Number of Print Copies | |
| Edit Information | Direction Information | |
| | Print Side Information | |
| | Rotation | |
| | Expansion/Reduction | |
| | Position of Image | Offset |
| | | Position Adjusting Information |
| | Layout Information | Custom・Imposition |
| | | Number of pages |
| | | Imposition Information |
| | | Page Oder Information |
| | | Creep Position Adjustment |
| | Margin Information | |
| | Crop・Mark Information | Center・Crop・Mark Information |
| | | Corner・Crop・Mark Information |
| Finishing Information | Collate Information | |
| | Staple/Bind Information | |
| | Punch Information | |
| | Folding Information | |
| | Trim Information | |
| | Output Tray Information | |
| | Input Tray Information | |
| | Cover・Sheet Information | |
| RIP Control Mode (Page Mode or Sheet Mode) | | |
| RIP Engine Identification Information | | |

FIG.15

RIP Parameter List

| ITEM | | |
|---|---|---|
| Input/Output Data Type Information | | |
| Input/Output Data Read/Write Position Designation Information | | |
| Input/Output Data Read/Write Position Information | | |
| Input/Output Data Read/Write Execution Mode | | |
| Measurement Unit Information (Dimension) | | |
| Input/Output Data Compression Method Information | | |
| RIP Control Mode | | |
| RIP Engine Identification Information | | |
| Input/Output Image Information Part | Information Related to Output Image | Image Format・Type |
| | | Image Format・Dimension |
| | | Image Format・Resolution |
| | | Position of Image |
| | | Color Separation Information |
| | | Color Plane・Fit・Policy Information |
| | | Plane Shift Information |
| | | Number of Bits in Image Format |
| | | Image Direction Information |
| | | Image Formation Position Information |
| | | Image Formation Size Information |
| | | Image Formation Method Information |
| | | Color ICC Information |
| | | Font Replacement Information |
| | | Image Formation Basic Point Information |
| | | Flat K Black Information |
| | | Rendering Information |
| | Information Related to Input Image | Image Format・Type |
| | | Image Format・Dimension |
| | | Image Format・Resolution |
| | | Position of Image |
| | | Input Data |
| | | Page Range Information |
| | | Color ICC Information |
| | Information Related to Operation of Image | Scaling・Offset Information |
| | | Object・Area Information |
| | | Halftone Information |
| | | Scaling・Algorithm Information |
| Information Related to PDL | Data Area | |
| | Size Information | |
| | Data Arrangement Method | |

FIG.16

RIP Parameter List

| ITEM | | |
|---|---|---|
| Input/Output Data Type Information | | JDF |
| Input/Output Data Read/Write Position Designation Information | | from Top |
| Input/Output Data Read/Write Position Information | | Top Address of JDF |
| Input/Output Data Read/Write Execution Mode | | READ |
| Measurement Unit Information (Dimension) | | |
| Input/Output Data Compression Method Information | | |
| RIP Control Mode | | |
| RIP Engine Identification Information | | |
| Input/Output Image Information Part | Information Related to Output Image | Image Format・Type |
| | | Image Format・Dimension |
| | | Image Format・Resolution |
| | | Position of Image |
| | | Color Separation Information |
| | | Color Plane・Fit・Policy Information |
| | | Plane Shift Information |
| | | Number of Bits in Image Format |
| | | Image Direction Information |
| | | Image Formation Position Information |
| | | Image Formation Size Information |
| | | Image Formation Method Information |
| | | Color ICC Information |
| | | Font Replacement Information |
| | | Image Formation Basic Point Information |
| | | Flat K Black Information |
| | | Rendering Information |
| | Information Related to Input Image | Image Format・Type |
| | | Image Format・Dimension |
| | | Image Format・Resolution |
| | | Position of Image |
| | | Input Data |
| | | Page Range Information |
| | | Color ICC Information |
| | Information Related to Operation of Image | Scaling・Offset Information |
| | | Object・Area Information |
| | | Halftone Information |
| | | Scaling・Algorithm Information |
| Information Related to PDL | Data Area | |
| | Size Information | |
| | Data Arrangement Method | |

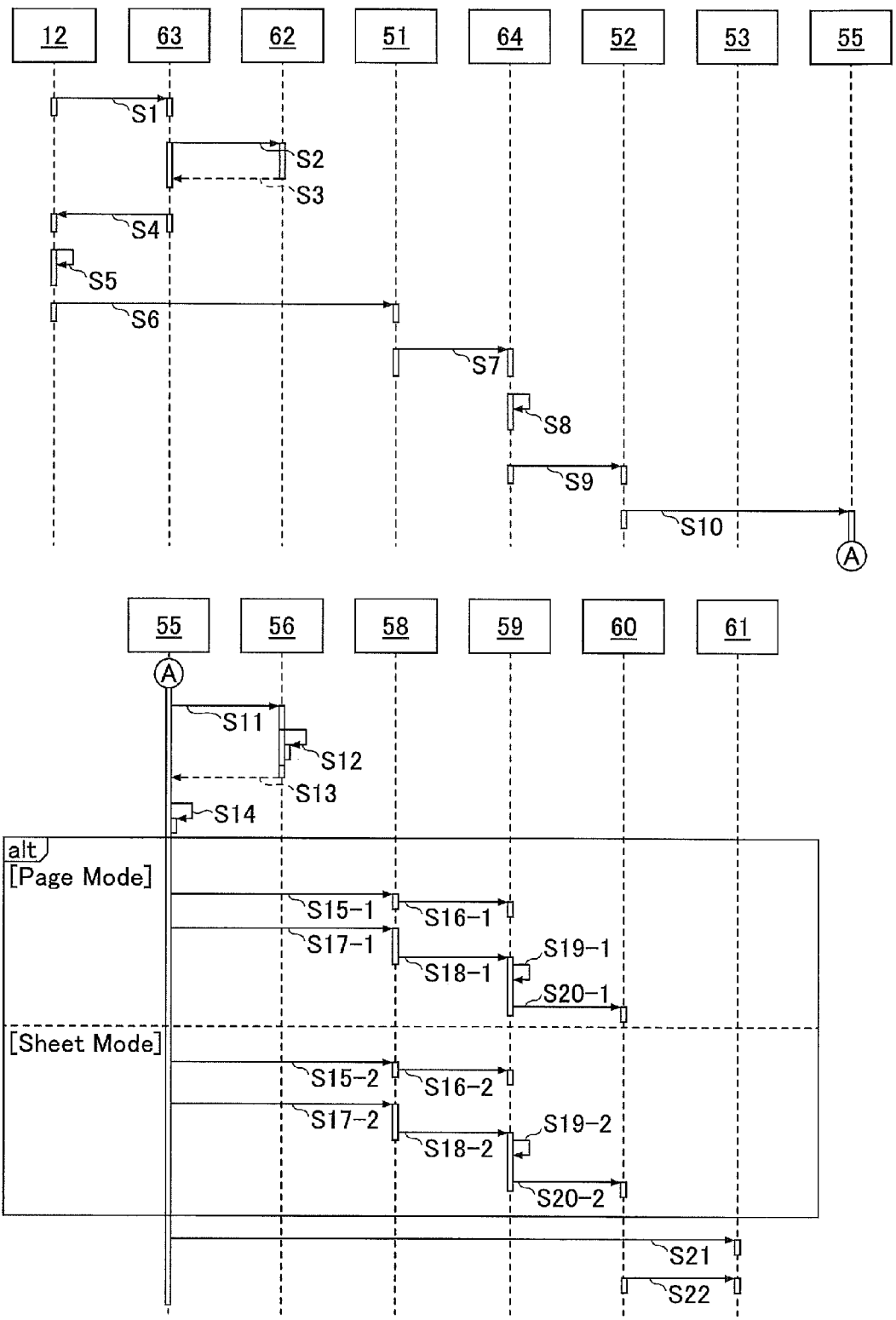

IMAGE PROCESSING APPARATUS, IMAGE PROCESSING SYSTEM AND RECORDING MEDIUM FOR PRINT JOBS THAT DESIGNATE RENDERING ENGINES

CROSS-REFERENCE TO RELATED APPLICATIONS

The present application claims priority to and incorporates by reference the entire contents of Japanese Patent Application No. 2014-047217 filed in Japan on Mar. 11, 2014 and Japanese Patent Application No. 2015-033947 filed in Japan on Feb. 24, 2015.

BACKGROUND OF THE INVENTION

1. Field of the Invention

The present technology relates to an information processing apparatus creating drawing data based on a printing job, and the like.

2. Description of the Related Art

So called production printing that is of printing service, in which a lot of documents for business use are printed or bound, is known (for example, Japanese Laid-open Patent Publication No. 2012-238188). In the Japanese Laid-open Patent Publication No. 2012-238188, a printing system for informing a user whether a post process is available or not, in view of the whole system, is disclosed.

In the production printing, a printing process is usually handled as a workflow, and opening of a printing workflow is proceeded with. By opening the printing workflow, it is possible to describe setting files, or the like for printing jobs in important printing processes, etc., by common format, in software (workflow applications, described below), or printers of different manufacturers. A standard format referred to as a JDF (Job Definition Format) is known, as a format for describing all the processes of the printing workflow.

There are various processes in the printing workflow, such as a process for creating documents or contents, processes for designating printing methods, printing processes, post processes, or the like. Although these processes are performed by various workflow applications or printing devices, cooperation of printing process management can be achieved between printing devices by the JDF.

However, some workflow applications or printing devices may extend the format of the JDF. In this case, the JDF provided by the workflow applications of the different manufacturers may include a description in proprietary format.

FIG. 1A is an illustration diagram for illustrating an example of an inconvenience in accepting printing jobs by a print processing device of a manufacturer "C". Additionally, FIG. 1A and FIG. 1B shows an example of a comparison, not an example of prior art. The print processing device of "C" receives printing jobs from workflow applications of a manufacturer "A" and a manufacturer "B". It may occur that the print processing device of "C" cannot analyze the JDF to process it since the respective workflow applications extend the format of the JDF.

Therefore, in order to accept the printing jobs of the respective workflow applications, the print processing device of "C" may have a rendering engines 59 (hereinafter, referred to as RIP engines 59) capable of JDF conversion and handling respective workflow applications. In FIG. 1B, a JDF analyzing unit 56 analyzes the JDF to determine the manufacturer of the workflow application, and converts the setting information so as to be processed by the print processing device of "C". Also, the printing jobs can be processed to print with a user's desired finished appearance, by installing the RIP engines 59 capable of handling respective workflow applications.

Thus, the print processing device of "C" can process the printing jobs to print with a user's desired finished appearance, even if the respective workflow applications extend the format of the JDF.

However, in the above description, since only the print processing device of "C" selects the RIP engine 59 based on the printing job, the workflow applications of "A" and "B" cannot designate the RIP engine 59.

RELATED ART DOCUMENT

Patent Document

[Patent Document 1]: Japanese Laid-open Patent Publication No. 2012-238188

SUMMARY OF THE INVENTION

An object of disclosure of the present technology is to provide an information processing apparatus whose rendering engine can be selected by external devices.

The following configuration is adopted to achieve the aforementioned object.

In one aspect of the embodiment, there is provided an information processing apparatus for creating drawing data based on a printing job, comprising: a plurality of drawing data creating units configured to create respective drawing data based on the printing job; a printing job receiving unit configured to receive the printing job designating a drawing data creating unit of the drawing data creating units; a printing job outputting unit configured to output the printing job received by the printing job receiving unit to the designated drawing data creating unit.

Other objects, features and advantages of the present invention will become more apparent from the following detailed description when read in conjunction with the accompanying drawings.

BRIEF DESCRIPTION OF THE DRAWINGS

FIG. 2 is an illustration diagram schematically illustrating an example of technical features of a DFE of the present embodiment;

FIG. 9A is an illustration diagram showing an example of a process request (query) sent from the application to the DFE;

FIG. 9B is an illustration diagram showing an example of the device information sent from the DFE to the application responsive to the query;

FIG. 10 is an illustration diagram showing an example of a frame format of the information indicating "Pass Through Mode" in the printing job given by "A" individual job receiving unit;

FIG. 11A is an illustration diagram showing a part of description in the JDF;

FIG. 11B is another illustration diagram showing a part of description in the JDF;

FIG. 11C is another illustration diagram showing a part of description in the JDF;

FIG. 12A is an illustration diagram illustrating an example of a conversion table of "C";

FIG. 12B is an illustration diagram illustrating an example of a conversion table of "A";

FIG. 12C is an illustration diagram illustrating an example of a conversion table of "B";

FIG. 14 is an illustration diagram illustrating an example of a "Job Attribute in DFE";

FIG. 15 is an illustration diagram illustrating an example of the "RIP Parameter List" created based on the PDL and the "Job Attribute in DFE";

FIG. 16 is an illustration diagram showing an example of the "RIP Parameter List" in a case where the "Path Through Mode" is set in the printing job;

FIG. 17 is a sequence diagram illustrating an example of the operation flow to process the printing job in a case where the "Pass Through Mode" is not set.

DETAILED DESCRIPTION OF THE PREFERRED EMBODIMENTS

Figure 1A:
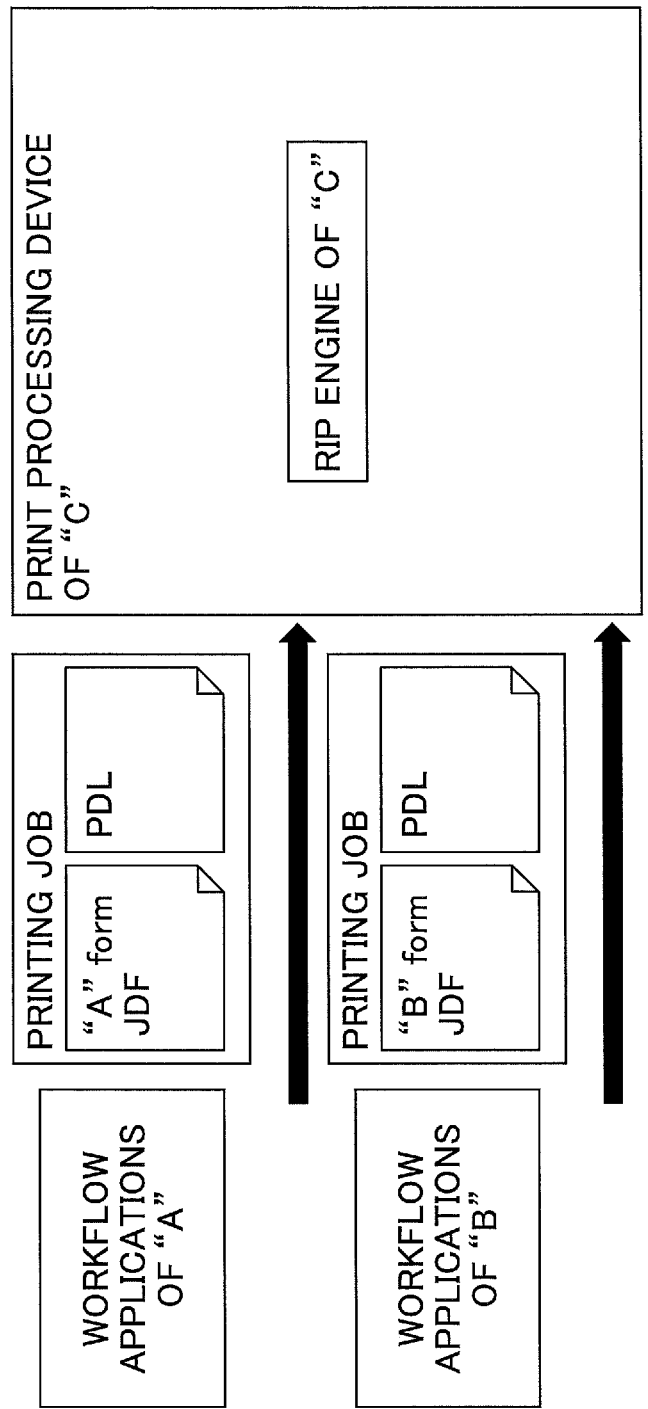
FIG. 1A is an illustration diagram for illustrating an example of an inconvenience in accepting printing jobs by a print processing device of a manufacturer "C"
Figure 1B:
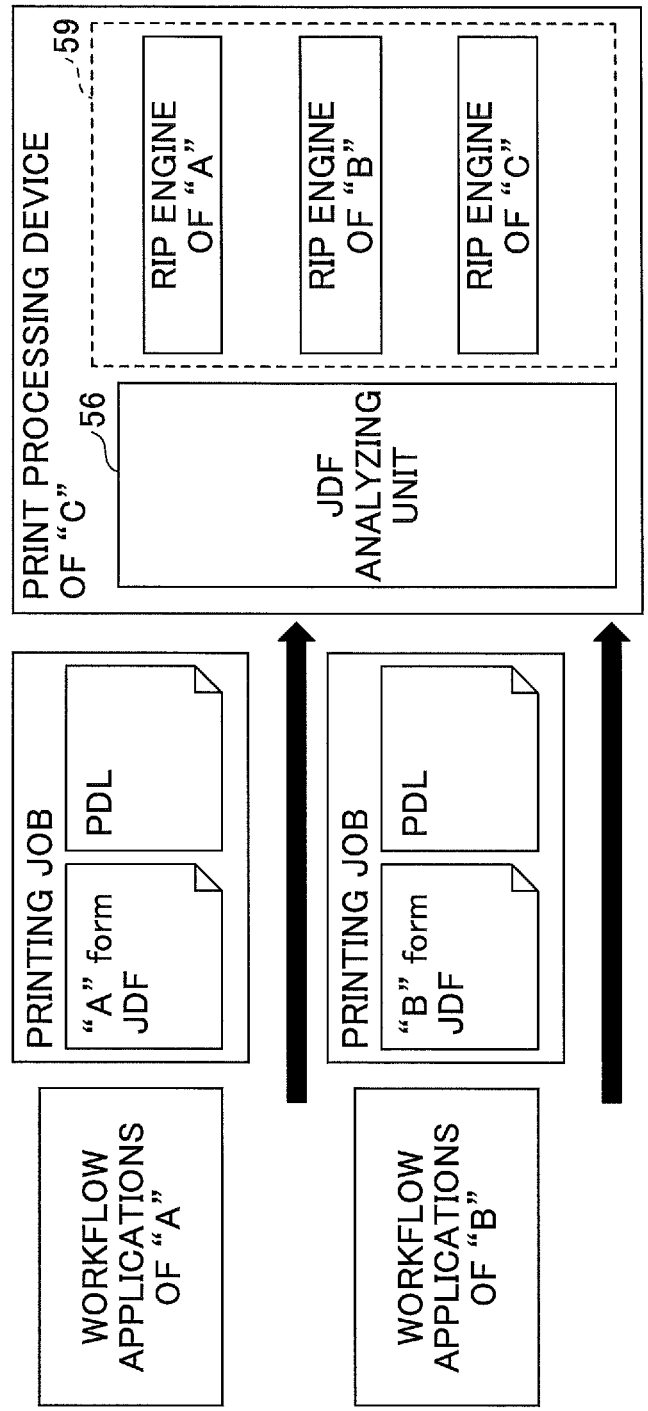
FIG. 1B is another illustration diagram for illustrating an example of an inconvenience in accepting printing jobs by a print processing device of a manufacturer "C"

Herein below, embodiments will be described with reference to accompanying drawings.

[How to Select the RIP Engine in the Present Embodiment]

FIG. 2 is an illustration diagram schematically illustrating an example of technical features of a DFE of the present embodiment. The DFE (Digital Front End) 32 in FIG. 2 corresponds to a print processing device.

1) The DFE of "C" includes a device information communicating unit 63.

The device information communicating unit 63 delivers information about RIP engines 59 (about RIP engine of "A", about RIP engine of "B", about RIP engine of "C") to respective workflow applications.

Therefore, the workflow applications can detect the RIP engines 59 included in the DFE 32, thereby designating an appropriate RIP engine 59.

2) The DFE of "C" includes an individual job receiving unit 64 (including "A" individual job receiving unit 64a, "B" individual job receiving unit 64b, and "C" individual job receiving unit 64c).

The individual job receiving unit 64 corresponds to the RIP engine 59. A printing job received by the "A" individual job receiving unit 64a is processed by the RIP engine 59 of "A", a printing job received by the "B" individual job receiving unit 64b is processed by the RIP engine 59 of "B", and a printing job received by the "C" individual job receiving unit 64c is processed by the RIP engine 59 of "C".

Therefore, the RIP engine 59 can be designated by designating the individual job receiving unit 64.

[Inconveniences in Designating Attributes by Workflow Software]

A configuration such as shown in FIG. 2 enables the workflow application to designate the RIP engine 59.

However, inconveniences, that the workflow applications cannot designate attributes which are not supported by the DFE 32, still remains.

Figure 3:
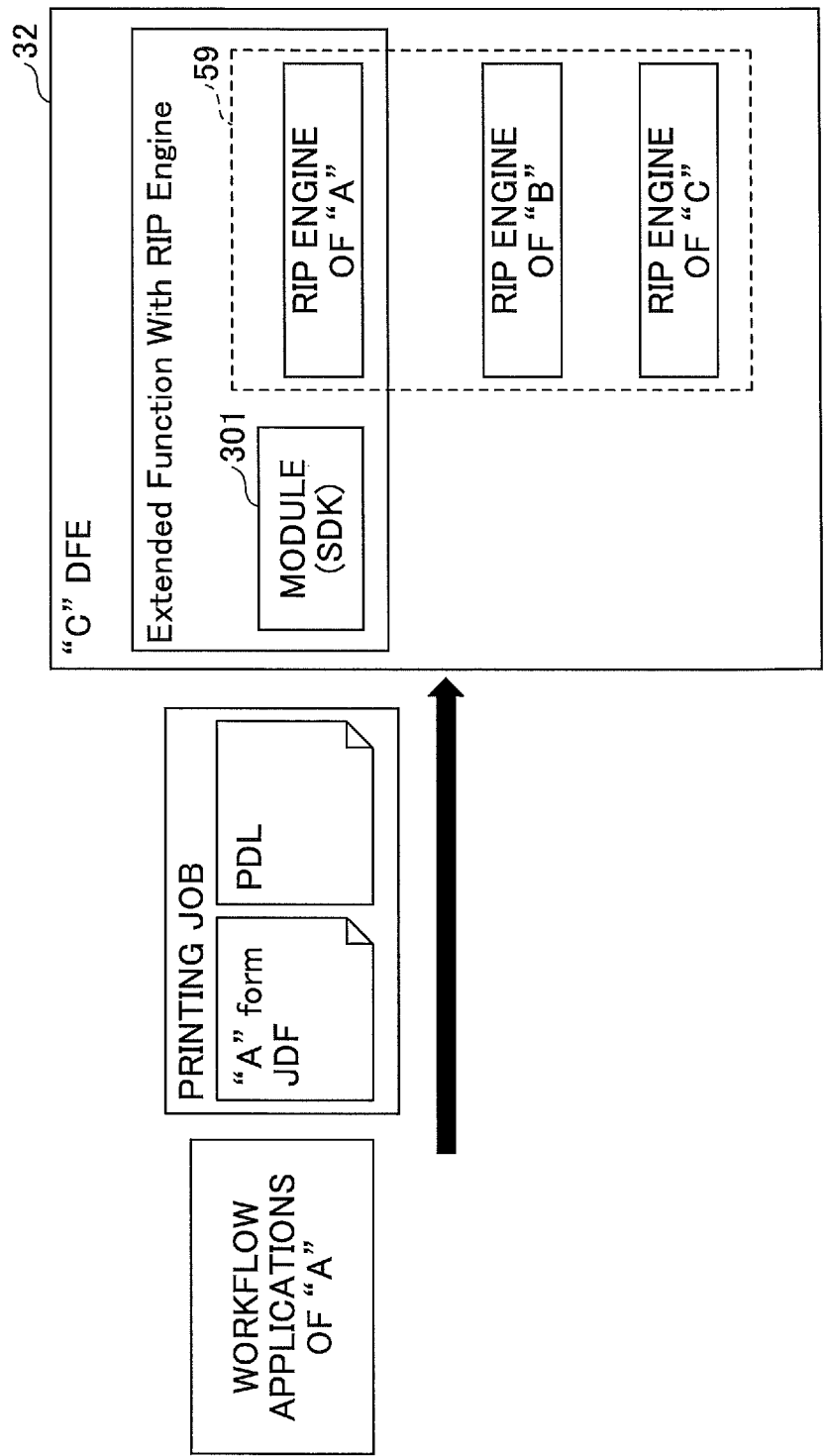
FIG. 3 is an illustration diagram illustrating an example of inconveniences for the workflow application of "A" in setting attributes for the RIP engine of "A"

The inconveniences are described with reference to FIG. 3. FIG. 3 is an illustration diagram illustrating an example of inconveniences for the workflow application of "A" in setting attributes for the RIP engine 59 of "A".

The manufacturer of the RIP engine 59 of "A" provides one or more SDK (Software Development Kit)s for extending implementation of the RIP engine 59 of "A" so as to increase the convenience of the RIP engine 59 of "A", or the like.

An arbitral company (in FIG. 3, shown as a manufacturer "A") creates a module for extending functions of the RIP engine 59 of "A" using the SDK, thereby constructing an environment where the RIP engine 59 of "A" can be used. Among such modules 301, there are some modules which can reflect attributes in raster data by analyzing not only PDL (Page Description Language) but also JDF (an example of setting information in the claims), when using the RIP engine 59. That is, since the module 301 created by the manufacturer "A" using the SDK can analyze the JDF, the workflow application of "A" can set the extended functions as the attributes of the JDF, thereby reflecting them in the raster data.

However, the DFE 32 is created and managed by a manufacturer "C". Therefore the attributes not recognized by the manufacturer "C" cannot be transmitted to the module 301 (RIP engine 59 of "A"). Further, the manufacturer "A" does not always disclose all the attributes to the manufacturer "C", only workflow application of "A" may be allowed to set the attributes.

Therefore, inconveniences that the workflow application of "A" cannot designate attributes which are not supported by the DFE 32 may occur. Although, in FIG. 3, the RIP engine 59 of "A" is exemplified, similar inconveniences may occur in a case where the RIP engine 59 of "B" is designated. In a case where the RIP engine 59 of "C" is designated, usually, the inconveniences do not occur since the DFE 32 of "C" recognizes the attribute. However, if there are some attributes which are not disclosed at all, similar inconvenience may occur.

[Schematic Configuration for Designating Attributes by Workflow Application]

Therefore, the DFE 32 of the present embodiment, solves the inconveniences that the workflow application of "A" cannot designate attributes which are not supported by the DFE 32, as described in the following.

Figure 4:
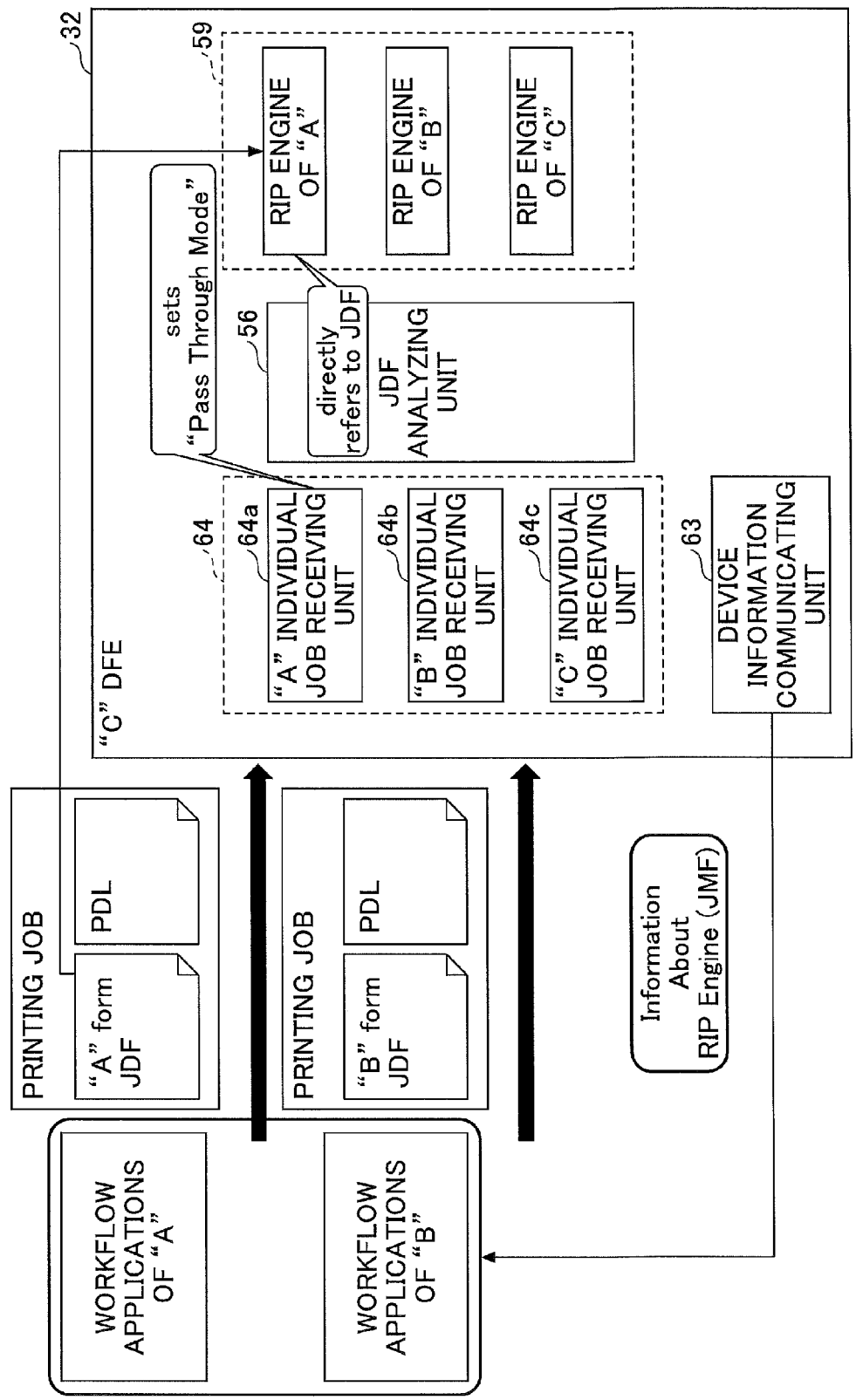
FIG. 4 is an illustration diagram illustrating an example of a schematic configuration for designating attributes, which DFE does not support, by workflow application.

FIG. 4 is an illustration diagram illustrating an example of a schematic configuration for designating attributes which the DFE does not support, by the workflow application. The configuration shown in FIG. 4 is almost same as that shown in FIG. 2. However, in the configuration shown in FIG. 4, the device information communicating unit 63 delivers information about the RIP engine 59 which accepts undisclosed attributes and information about the individual job receiving unit 64 (in FIG. 4, the "A" individual job receiving unit 64a) which accepts the printing jobs for the RIP engine 59. Thus, the workflow application obtains the raster data in which undisclosed attributes are reflected, by setting the undisclosed attributes in the printing job and sending it to the "A" individual job receiving unit 64a.

The "A" individual job receiving unit 64a adds information indicating "Pass Through Mode" to the received printing job.

The DFE 32 processes the printing job so that the RIP engine 59 can directly refer the JDF of the printing job in a case where the "Pass Through Mode" is set in the printing job. Thus, the RIP engine 59 of "A" can create the raster data based on the JDF created by the workflow application of "A".

Therefore, the workflow application can designate not only the RIP engine 59 but also undisclosed attributes with respect to the DFE 32, by setting the "Pass Through Mode" by the individual job receiving unit 64 when the RIP engine 59, which refers undisclosed attributes, is designated.

[Example Configuration]

Figure 5:
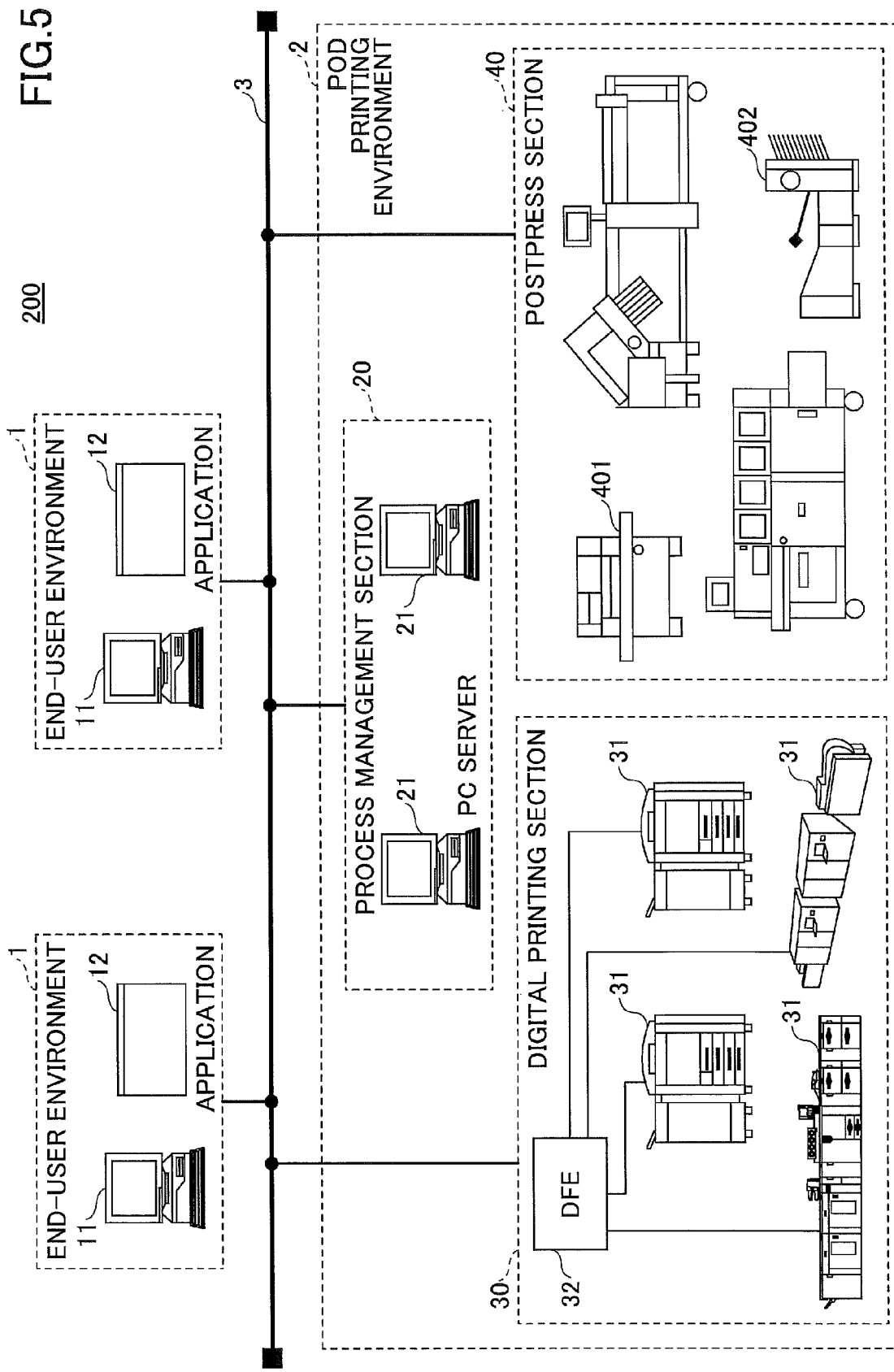
FIG. 5 is a schematic diagram illustrating an example of the whole structure of a print system of the present embodiment.

FIG. 5 is a schematic diagram illustrating an example of the whole structure of a print system 200 of the present embodiment. The print system (an example of the information processing system in the claims) of the present embodiment includes one or more end-user environments 1 and a POD (Print On Demand) printing environment 2, which are connected with each other through a network 3 such as a LAN or the Internet.

In the end-user environment 1, a client PC 11 is disposed. A workflow application (hereinafter simply referred to as an application) 12 for a POD printing operation is installed in the client PC 11, and the client PC 11 creates printing jobs accepting user operations.

The application 12 includes a function of an aggregation print (number up imposing function) for imposing a plurality of logical page images on a surface of a printer sheet, and a function of image editing for adding a header, a footer, or a page number. Also, the application 12 outputs instructions such as punching or stapling for print bookbinding. Such instructions or settings are described in the JDF. The JDF may be referred to as a job ticket, or a print instruction.

The POD printing environment 2 includes a process management section 20, a digital printing section 30 and a postpress section 40, which are connected with each other through the network 3. In the POD printing environment 2, the process management section 20 instructs the digital printing section 30 and the postpress section 40 to operate, and consolidates the workflow of the POD printing environment 2.

The process management section 20 receives the printing jobs (JDF and PDL) from the end-user environment 1, and saves the printing jobs. Although PDL is a language for specifying how to draw a page image (rasterized image), in the present specification the PDL (an example of printing data in the claims) means data described in the PDL. The PDL includes PDF (Portable Document Format), PostScript, PCL, RPDL, and the like.

Also, the process management section 20 assembles operations in the respective processes in a workflow, based on the printing jobs from the end-user environment 1, or schedules operations of the digital printing section 30, the postpress section 40, or the operators so as to be effectively performed. Further, the process management section 20 informs the operators of error occurrences, if needed. Generally, the process management section 20 is configured to include one or more PC servers 21.

The process management section 20 sends the printing jobs to the digital printing section 30 to let the digital printing section 30 print them. Further, printed documents are sent to the postpress section 40, and the postpress section 40 performs bookbinding, or the like, based on the instructions from the process management section 20. Additionally, the digital printing section 30 may directly send the printing jobs to the postpress section 40.

The digital printing section 30 is configured to include various printers 31 (printer devices such as printers for production printing, high speed color inkjet printers, and color/monochrome MFPs) 31. In the digital printing section 30, the DFE 32 is disposed. The DFE 32, also referred to as a print processing device, controls printing by the printers 31. As shown in FIG. 4, the DFE may be separately disposed from the printers 31, or may be included in the printers 31. When receiving the printing job from the process management section 20, the DFE 32 generates raster data (an example of drawing data in the claims), using the JDF and the PDL, and sends it to the printer 31 for printer 31 to form an image by toner or ink.

The digital printing section 30 includes various printers 31. Additionally, the digital printing section 30 may include a printer 31 directly connected with a finisher (post processing device) which performs post processes such as sheet folding, saddle stitching, binding a book by enfolding inner sheets with a cover sheet, and punching on the printed papers.

The postpress section 40 is configured to include, according to instructions for the printed documents (postpress jobs) operations from the process management section 20, post processing devices such as a sheet folder, a saddle stitching binder, an enfolding binder, a sheet cutter, a sheet enclosing machine, or a sheet mounting machine. Further, the postpress section 40 performs finishing processes such as sheet folding, saddle stitching, binding a book by enfolding inner sheets with a cover sheet, cutting, enclosing, or mounting on the printed papers output from the digital printing section 30. The postpress section 40 includes post processing devices for performing work after digital printing (post process), such as a stapler 401 and a puncher 402.

An end-user of the end-user environment 1 edits, imposes, inserts text, or instructs performing the post process by using the application 12 for POD printing operations installed in the client PC 11, and sends the printing jobs to the process management section 20 of the POD printing environment 2.

The PC server 21 of the process management section 20, according to the JDF, instructs the digital printing section 30 to print, and instructs the postpress section 40 to perform post processes.

[Hardware Configuration]

In the present embodiment, the printing jobs created by the end-user environment 1 are received by the process management section 20, and the process management section 20 sends the printing jobs to the DFE 32. The functions of the DFE 32 may be performed by a device in the network instead of the DFE 32. In the present embodiment, the DFE 32 delivers the information about the RIP engine 59 and sets the "Pass Through Mode".

Figure 6:
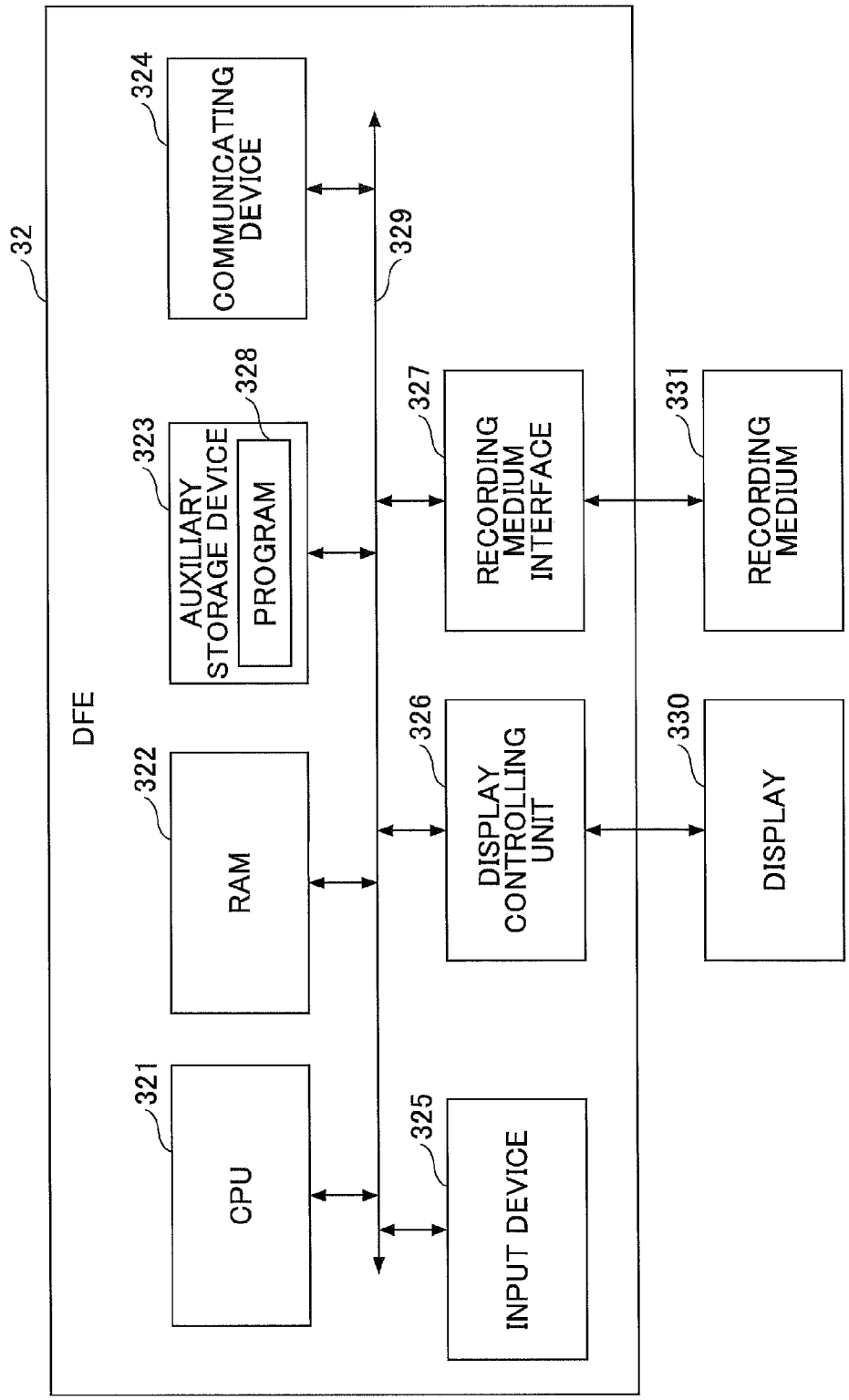
FIG. 6 is a block diagram illustrating an example of a hardware configuration of the DFE.

FIG. 6 is a block diagram illustrating an example of a hardware configuration of the DFE 32. For example, the DFE 32 has the hardware configuration shown in FIG. 6. That is, the DFE 32 includes a function to serve as an information processing device (computer). DFE 32 includes a CPU 321, a RAM 322, an auxiliary storage device 323, a communicating device 324, an input device 325, a display controlling unit 326 and a recording medium interface 327, which are connected with each other through a bus 329.

The CPU 321 controls the entire DFE 32 by executing programs using the RAM 322 as a work memory. The auxiliary storage device 323 is a nonvolatile memory such as a HDD (Hard Disk Drive), or an SDD (Solid State Drive). The auxiliary storage device 323 stores a program 328 capable of converting the printing job.

The communicating device 324 is a modem, a LAN card, or the like, to communicate with the end-user environment 1, the process management section 20, or the postpress section 40, by connecting to the network 3. Also, the communicating device 324 communicates with the printer 31. The input device 325 is a keyboard, a mouse, or the like, accepting the user's operations. The display controlling unit 326, being connected with the display 330, displays screens on the display 330 under control of the CPU 321. Additionally, the display 330 may include a touch screen.

The recording medium interface 327 writes data on the recording medium 331, and reads data from the recording medium 331 under control of the CPU 321, where a portable recording medium is detachably attached to the recording medium interface 327. The recording medium 331 is an optical, an electrical, or a magnetic recording medium, such as a CD-ROM, an optical disk, a USB memory or an SD card; or another semiconductor memory, which records data electrically, such as flash memory. Various types of memory can be used as the recording medium 331.

Additionally, the program 328 is distributed being stored in the recording medium 331, or distributed by being downloaded from a server (not shown) through the network 3.

Also, the client PC 11 in the end-user environment 1 and the PC server 21 in the process management section 20 respectively have hardware configurations similar to that of FIG. 6.

[Function of DFE]

Figure 7:
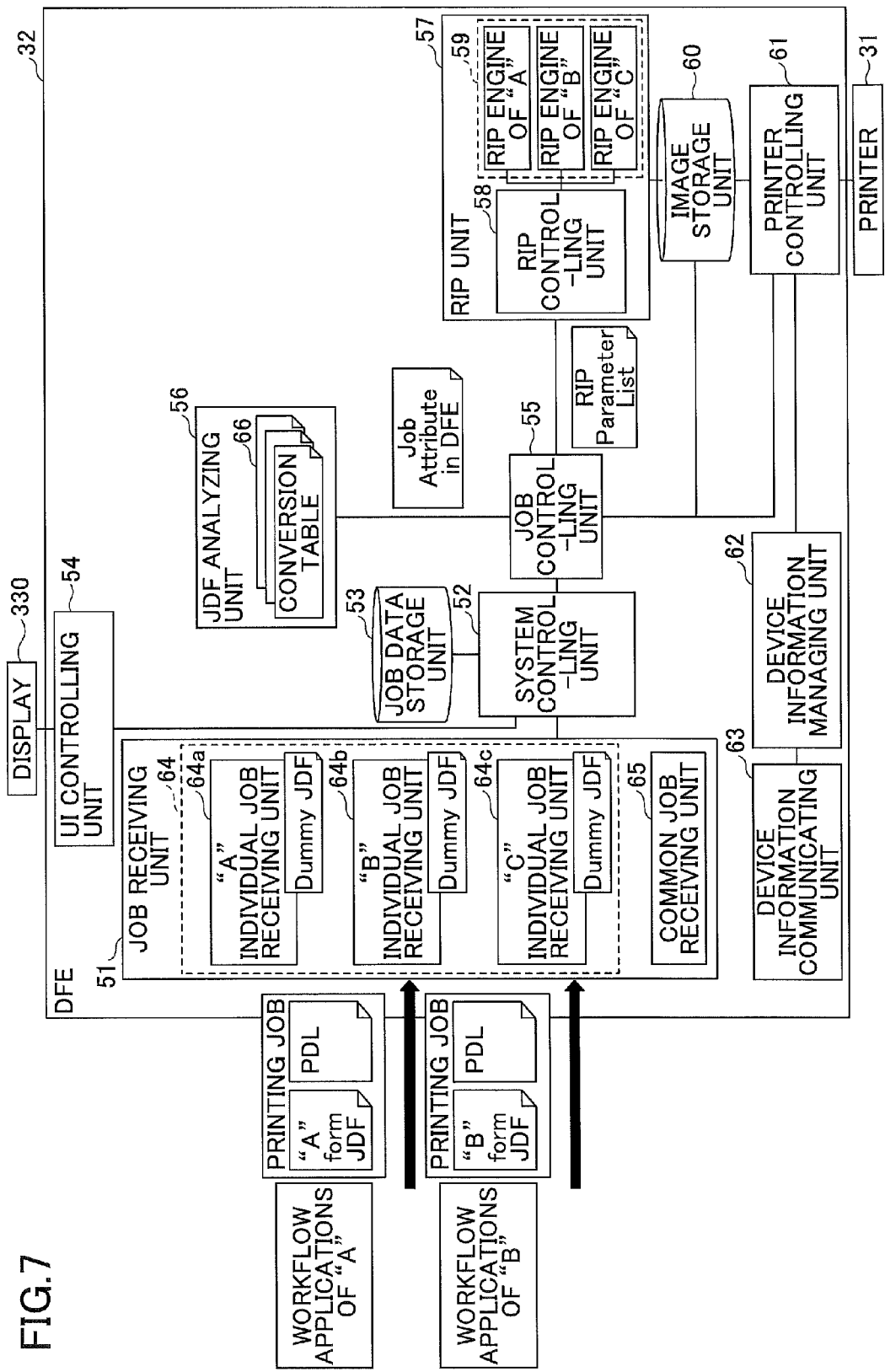
FIG. 7 is a block diagram illustrating an example of a functional configuration of the DFE.

FIG. 7 is a block diagram illustrating an example of a functional configuration of the DFE 32. The DFE 32 performs job control, RIP control, or printer control, in a print workflow. Thus, the DFE 32 serves as a server that provides the end-user environment 1 and the process management section 20 with important functions of printing. Additionally, job control means a control of a series of printing job processes, such as accepting the printing job, analyzing the JDF, creating raster data, printing by the printers 31, and the like. RIP control means control of the RIP engines 59 to create the raster data by creating a "RIP Parameter List" after creating "Job Attributes in DFE" described later. RIP stands for "Raster Image Processor", and means a specific IC for creating the raster data, or a creation of the raster data itself. Printer control means a control of the printers to print by sending the printers 31 the raster data and a part of the "Job Attributes in DFE" ("Finishing Information" described later).

The DFE 32 includes a job receiving unit 51, a system controlling unit 52, a UI controlling unit 54, a job controlling unit 55, a JDF analyzing unit 56, a RIP unit 57, a RIP controlling unit 58, RIP engines 59, and a printer controlling unit 61, a device information managing unit 62, and a device information communicating unit 63. Functions of these units are achieved by executing the program 328 by the CPU 321 in cooperation with various hardware resources which include hardware shown in FIG. 6. Further, the DFE 32 includes a job data storage unit 53 and an image storage unit 60, which are included in the configurations of auxiliary storage device 323, the RAM 322, the recording medium 331, or the like.

The job receiving unit 51 receives the printing jobs. The job receiving unit 51 records, for example, unique job numbers, received dates, finished dates, statuses, etc., as log information respectively associated with the printing jobs. The printing jobs are received, for example, through the following paths. The printing jobs may be input from the application 12, or the like, through the network 3, or may be retrieved from the recording medium 331 by the job receiving unit 51.

The job receiving unit 51 includes the "A" individual job receiving unit 64a, the "B" individual job receiving unit 64b, the "C" individual job receiving unit 63c (in a case where these are not required to be separately distinguished, referred to as the individual job receiving unit 64), and a common job receiving unit 65.

The "A" individual job receiving unit 64a receives the printing jobs designating the RIP engine 59 of "A". In other words, the workflow application which designates the RIP engine 59 of "A" sends the printing jobs to the "A" individual job receiving unit 64a. The "B" individual job receiving unit 64b receives the printing jobs designating the RIP engine 59 of "B". In other words, the workflow application which designates the RIP engine 59 of "B" sends the printing jobs to the "B" individual job receiving unit 64b. The "C" individual job receiving unit 64c receives the printing jobs designating the RIP engine 59 of "C". In other words, the workflow application which designates the RIP engine 59 of "C" sends the printing jobs to the "C" individual job receiving unit 64c. The common job receiving unit 65 receives the printing jobs without designating the RIP engine 59.

The "A" individual job receiving unit 64a adds information about the RIP engine 59 which corresponds to the "A" individual job receiving unit 64a in "RIP Engine Identification Information". The "B" individual job receiving unit 64b adds information about the RIP engine 59 which corresponds to the "B" individual job receiving unit 64b in "RIP Engine Identification Information". The "C" individual job receiving unit 64c adds information about the RIP engine 59 which corresponds to the "C" individual job receiving unit 64c in "RIP Engine Identification Information". A detailed description of the "RIP Engine Identification Information" will be given later.

In the present description, the RIP engine 59 of "A" is the RIP engine 59 which creates the raster data using the undisclosed attributes with respect to the DFE 32. Therefore, the "A" individual job receiving unit 64a sets the "Pass Through Mode" in the printing jobs. That is, the "A" individual job receiving unit 64a is an individual job receiving unit for the printing job with the "Pass Through Mode" in the individual job receiving unit 64. Also, in the present embodiment, the "B" individual job receiving unit 64b and the "C" individual job receiving unit 64c do not set the "Pass Through Mode" in the printing jobs.

Further, the respective individual job receiving units have dummy JDFs. In a case where an attribute (may be specified or arbitral) is not set in the JDF of the received printing job, individual job receiving unit 64 changes the JDF based on the values in the dummy JDF.

The dummy JDFs of the individual job receiving unit 64 are prepared corresponding to the respective RIP engines 59 by the manufacturer "C". The dummy JDF is a JDF (described later) which includes general tags (attributes) and typical values of the attributes. The typical values mean, for example, that "1" of the "Amount", "0" of the "Rotate", or the like. Since the range of the values of the attributes handled by the respective RIP engines 59 and the typical values thereof are known, the manufacturer "C" can prepare the dummy JDFs corresponding to the respective RIP engines 59, in which the typical values are set in the respective attributes.

The individual job receiving unit 64 retrieves attributes from the dummy JDF in a case where the attributes are not set in the JDF of the printing job. Also, the dummy JDF is added to the printing job in a case where the JDF is not included in the printing job. Further, the attributes, whose values are exceeding the prescribed ranges of the values corresponding to the respective RIP engines 59, are detected to determine that a JDF which is not compatible with the RIP engine 59 is received. In this case, the values of the attributes in the JDF are corrected into that of the dummy JDF.

By preparing the dummy JDF, the DFE 32 can create the "Job Attributes in DFE" (described later), even if the application 12 has not set some attributes in the JDF or has not included the JDF in the printing job.

The job receiving unit 51 outputs the printing jobs (JDF+PDL) to the system controlling unit 52. Additionally, the JDF which created by the dummy JDF may be referred simply to as the JDF.

The system controlling unit 52 stores the received printing jobs in the job data storage unit 53, or outputs them to the job controlling unit 55. For example, in a case where the JDF 32 is set, in advance, to store the printing jobs in the job data storage unit 53, the system controlling unit 52 stores the printing jobs in the job data storage unit 53. Also, for example, in a case where a description on whether storing the job in the job data storage unit 53 is included in the JDF, the DFE 32 follows the description.

Further, for example, in a case where a user operation for displaying the printing jobs stored in the job data storage unit 53 on the display 330 is given, the system controlling unit 52 outputs the JDF stored in the job data storage unit 53 to the UI controlling unit 54. When the user change the JDF, the UI controlling unit 54 accepts the change, and the system controlling unit 52 stores again the changed JDF in the job data storage unit 53.

When receiving the instructions to execute the printing jobs from the user, the end-user environment 1, or the process management section 20, the system controlling unit 52 outputs the printing jobs stored in the job data storage unit 53 to the job controlling unit 55. Also, for example, in a case where a time to print is described in the JDF, the system controlling unit 52 outputs the printing jobs stored in the job data storage unit 53 to the job controlling unit 55, at the described time.

The job data storage unit 53 is a memory area for storing the printing jobs as described above, being included in the auxiliary storage device 323 or the recording medium 331 of the DFE 32. Further, the job data storage unit 53 may be included in a storage device on the network (not shown).

The UI controlling unit 54 displays the content of the printing job on the display 330, by analyzing the JDF. Further, in the present embodiment, the UI controlling unit 54 displays the raster data, created by the RIP engines 59, on the display 330. Also, the UI controlling unit 54 accepts the user's selection of the RIP engine 59 and informs the job controlling unit 55.

The job controlling unit 55 controls the RIP controlling unit 58 to create the raster data, and controls the printer controlling unit 61 to print. Specifically, the job controlling unit 55 first sends the JDF of the printing job to the JDF analyzing unit 56, while outputting a JDF conversion request to the JDF analyzing unit 56. Meanwhile, in a case where the "Pass Through Mode" is set in the printing job, the printing job is not output to the JDF analyzing unit 56 since the RIP engine 59 is allowed to directly refer to the JDF.

The JDF analyzing unit 56 receives the JDF and the JDF conversion request from the job controlling unit 55. The JDF analyzing unit 56 analyzes the description of the JDF to determine the manufacturer of the application 12 (or the appropriate RIP engine 59 to process the JDF), thereby reflecting the determination result in the "RIP Engine Identification Information". When the "RIP Engine Identification Information" is set in the JDF, usually, the determination result is equivalent to the "RIP Engine Identification Information". However, if the determination result is different from the "RIP Engine Identification Information", the "RIP Engine Identification Information" is prioritized.

The JDF analyzing unit 56 converts the JDF into the "Job Attribute in DFE" which can be handled by the DFE 32, by using a conversion table 66 prepared for the respective manufacturers. That is, in a case where the DFE 32 is created by the manufacturer "C", the JDF created by the application of not only manufacturer "C" but also manufacture "A" or "B" is converted into the "Job Attribute in DFE" which can be handled by the DFE 32 of "C".

When creating the "Job Attribute in JDF", the JDF analyzing unit 56 sets a "RIP Control Mode" in the "Job Attribute in JDF". "Page Mode" or "Sheet Mode" is set in the "RIP Control Mode" (described later). It is researched in advance to know that with the "Page Mode" or the "Sheet Mode", the respective manufacturer creates the printing job. Therefore, if the manufacturer of the application 12 having created the JDF is determined, the "RIP Control Mode" can be determined too. In the present embodiment, the DFE 32 expects to use the "Page Mode" in aggregation print setting ("Page Mode" is the default mode of operation).

Thus, the job controlling unit 55, having received the "Job Attribute in DFE", converts the "Job Attribute in DFE" and the PDL into "RIP Parameter List", thereby outputting the printing job as the "RIP Parameter List" to the RIP controlling unit 58.

In the present embodiment, when the "Pass Through Mode" is set in the printing job, the job controlling unit 55 creates the "RIP Parameter List" based on the PDL and the JDF since the JDF analyzing unit 56 is not allowed to create the "Job Attribute in DFE". In this case the "Job Attribute in DFE" is not created because the RIP engine 59 directly refers to the JDF and does not require the "Job Attribute in DFE". Also, information for enabling the RIP engine 59 to refer to the JDF is set in a certain item in the "RIP Parameter List" so that the RIP engine 59 can directly refer to the JDF.

The "RIP Parameter List" includes a "RIP control mode". The RIP controlling unit 58 controls the RIP engines 59 with reference to the "RIP control mode". Therefore, a sequence is determined based on the "RIP control mode".

"Page Mode". In this mode, an instruction for RIP processing is given page by page, and the raster data, in which the pages are aggregated into one sheet, is created.

"Sheet Mode". In this mode, a plurality of pages are aggregated into one sheet in advance, and an instruction for RIP processing is given part by part (respectively corresponding to pages before being aggregated) of the sheet, thereby creating the raster data.

Also, in a case where the "Pass Through Mode" is set in the printing job, the job controlling unit 55 sets the "Pass Through Mode" in the "RIP control mode" of the "RIP Parameter List". That is, in the "RIP control mode", the "Pass Through Mode" is settable as well as the "Page Mode" and the "Sheet Mode". Additionally, the "Pass Through Mode" is not necessary to be set in the "RIP control mode", but may be set in a predetermined item of the "RIP Parameter List". Further, the job controlling unit 55 sets the "RIP Engine Identification Information" in the "RIP Parameter List".

The RIP unit 57 includes the RIP controlling unit 58 and the RIP engines 59, and creates the raster data by using these units. The RIP controlling unit 58 analyzes information in the "RIP Parameter List" thereby determining the RIP engine 59 to be used. The RIP engine 59 is determined based on one or more items in the "RIP Parameter List" or based on the "RIP Engine Identification Information" indicated on the "RIP Parameter List". For example, the "RIP Engine Identification Information" is set by one of the JDF analyzing unit 56 and the individual job receiving unit 64. In a case where the individual job receiving unit 64 sets the "RIP Engine Identification Information", the RIP engine 59 is determined based on the "RIP Engine Identification Information". Also, in a case where the "Pass Through Mode" is set in the "RIP control mode", the RIP engine 59 is determined based on the "RIP Engine Identification Information". The RIP controlling unit 58 sends RIP commands to the selected RIP engine 59 with reference to the "RIP Parameter List".

The "RIP Parameter List" (an example of the control data in the claims) is a group of information for performing RIP process. The job controlling unit 55 determines commands of RIP process to be provided to the RIP engine 59. The commands are referred to as RIP commands. The "RIP Parameter List" includes a "RIP control mode". The RIP controlling unit 58 controls the RIP engines 59 with reference to the "RIP control mode". Therefore, a sequence is determined based on the "RIP control mode".

The RIP controlling unit 58, with reference to the "RIP Parameter List", in a case where the "RIP control Mode" is the "Sheet Mode", outputs RIP commands according to the "Sheet Mode". Thus, the differences in the printing jobs are consolidated.

The RIP engines 59 are rendering engines for creating the raster data by rasterizing according to the RIP commands. The RIP engine 59 (RIP engine 59 of "A" in the present embodiment) refers the JDF using the information for accessing the JDF in the "RIP Parameter List" in a case where the "Pass Through Mode" is set in the "RIP Parameter List".

The image storage unit 60 is a storage means for storing the created raster data. In a case where the dummy JDF is created, a plurality of the raster data are stored with respect to one printing job. For example, the image storage unit 60 is included in the auxiliary storage device 323. Also, the image storage unit 60 may be included in a storage device in the network.

The printer controlling unit 61, being connected with the printer 31, retrieves the raster data stored in the image storage unit 60, and sends it to the printer 31, and thereby performs printing. Also, the finishing processes are performed based on the "Finishing Information" received from the job controlling unit 55.

The printer controlling unit 61 can obtain printer information by communicating with the printer 31 using various communication standards. For example, in CIP4 which creates standards for printing a workflow defines a standard of DevCaps, as a JDF standard, for transferring device specific information to printers. Also, a method for gathering printer information, by using a communication protocol of SNMP (Simple Network Management Protocol) and a database of MIB (Management Information Base), is known. By using these, the printer controlling unit 61 obtains various information stored in the printer 31. For example, information on configurations of equipment of the printer 31 (such as whether an ADF is included or not, whether a double-sided printing unit is included or not, whether a manual insertion tray is included or not, whether finishers are included or not, etc.) can be obtained. Also, the state of the printer 31 (such as printing, scanning, fax receiving, sleeping, etc.) can be detected. Further, a paper remaining amount can be detected.

The device information managing unit 62 manages device information of the individual job receiving unit 64 corresponding to the RIP engine 59, device information of the DFE 32, or device information of the printer 31 being connected. The device information of the DFE 32 includes information about the individual job receiving unit 64 of the DFE 32, about the manufacturer of the RIP engine 59, whether the RIP engine 59 supports the "Pass Through Mode" or not, which one of the "Page Mode" and the "Sheet Mode" the RIP engine 59 is expected to be operated in, and the like. The device information of the printer 31 includes identification information of the printer 31 being connected, information on the finishing performable by the printer 31. The device information managed by the device information managing unit 62 is obtained from the RIP engine 59 when the DFE 32 is activated, obtained by being retrieved from files, or the like.

The device information communicating unit 63 sends the device information, for example, by using JMF (Job Messaging Format) to the application 12 (client PC). The JMF is language used between the client PC 11 and the DFE 32. The application 12 (client PC) is an example of the external device in the claims. The JMF is defined according to the specification of the JDF and described in XML. The DFE 32 can send statuses of the system, events of the printing job, various log information of executed printing jobs, or the like, by using the JMF. Additionally, the MIB may be used as well.

Figure 8:
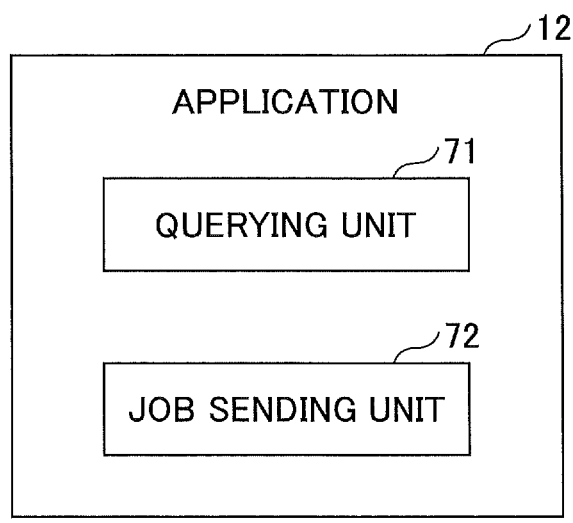
FIG. 8 is a block diagram showing functional configuration of the application.

FIG. 8 is a block diagram showing functional configuration of the application 12. Additionally, in FIG. 8, functions for receiving the printing job or accepting user operation are omitted. The application 12 includes an querying unit 71 and a job sending unit 72. Functions or means of these units are achieved by executing the program of application 12 by the CPU 321 of an information processing apparatus, in which the application 12 is installed, in cooperation with various hardware resources.

The querying unit 71 sends a "Query Message" (described later) to the DFE 32. That is, the device information of the RIP engine 59 included in the DFE 32, etc. queries the DFE 32. The job sending unit 72 selects the RIP engine 59 based on the device information about the RIP engine 59 included in the DFE 32, or the like, received as a response to the query, and sends the printing job to the individual job receiving unit 64 for receiving the printing job for the selected RIP engine 59.

[Device Information Sent by Device Information Communicating Unit]

FIG. 9A is an illustration diagram showing an example of process request (query) sent from the application 12 to the DFE 32. In FIG. 9A, line numbers are given for convenience in describing. A JMF tag described in the first line indicates that "Workflow Software A" sends a JMF message to "DFE".

"JDF xmlns="http://www.CIP4.org/JDFSchema_1_1"" indicates being a job ticket in compliance with the CIP4.

"xmlns:C="www.ccc.com/schema/ccc"" indicates JDF tag definition not in compliance with the CIP4, extended by print business operators/venders. In this example, tags stared with "C:" in the JDF are extended tags.

A Comment tag described in the second line informs the version of API (Application Interface) supported by "Workflow Software A". A Query tag described in the third line informs Query ID and that content of the query is the device information (KnownDevices).

FIG. 9B is an illustration diagram showing an example of the device information sent from the DFE to the application 12 responsive to the query. The device information is an example of the unit information in the claims. Important descriptions in the device information of the present embodiment are illustrated in the following. A JMF tag described in the second line indicates that the "DFE" sends a JMF message to "Workflow Software A". A Response tag described in the fourth line indicates that content of the response is the device information (KnownDevises).

In the 9th-11th line, the individual job receiving unit 64a and the device information are described. A VirtualPrinter tag is for indicating the individual job receiving unit 64. A Name attribute is for indicating a unique name identifying the individual job receiving unit 64. A RipEngine tag is for indicating information of the RIP engine 59. A RipMode attribute is for indicating the "RIP Control Mode". A Manufacturer tag is for indicating a manufacturer (or vender) of the RIP engine 59. Therefore, the RIP engine 59 of "A" is referred to as "VirtualPrinterA", indicating the individual job receiving unit 64a. The "PassThrough" ("Pass Through Mode") is settable in "RIP Mode" (RIP control mode) and the "Page" ("Page Mode") is indicated as a mode in which printing is performed. The "Manufacturer" is "A".

In the 12th-14th line, the device information of the RIP engine 59 of "B" is described. The RIP engine 59 of "B" is referred to as "VirtualPrinterB" whose "RIP Mode" (RIP control mode) is "Sheet" ("Sheet Mode"). The "Manufacturer" is "B".

In the 15th-17th line, the device information of the RIP engine 59 of "C" is described. The RIP engine 59 of "C" is referred to as "VirtualPrinterC" whose "RIP Mode" (RIP control mode) is "Page" ("Page Mode"). The "Manufacturer" is "C".

The application 12 can obtain information about the RIP engine 59 included in the DFE 32 based on such device information. For example, the RIP engine 59 can be designated by setting the attribute of "Name" in the VirtualPrinter tag as designation information.

[Designation of Individual Job Receiving Unit by Application]

The job sending unit 72 of the application 12, receiving the device information, sends the printing job to the DFE 32 designating an appropriate individual job receiving unit 64. The RIP engine 59 for the application 12 may be predetermined or may be designated by the user. For example, the application 12 of "A" selects "VirtualPrinter Name="VirtualPrinterA" where the attribute "Manufacturer" (name of the manufacture) is "A".

In a case where, for example, the "RipMode" (not the name of the manufacture) is prioritized, the individual job receiving unit 64 is selected taking account of "Page" or "Sheet", or whether the "PassThrough" is settable or not.

The job sending unit 72 having selected the individual job receiving unit 64 sends the printing job designating the individual job receiving unit 64 by, for example, describing the following URL (Uniform Resource Locator).

HTTP://Hostname/DeviceID/VirtualPrinterName

"Hostname" indicates the hostname of the DFE 32, an IP address may be described instead.

"DeviceID" is the same as that used in the "Query message".

"VirtualPrinterName" is set as a value of the attribute "Name" in the VirtualPrinter tag described in "Response Message".

Therefore, in a case where the job sending unit 72 selects the RIP engine 59 of "A" (selects the "A" individual job receiving unit 64a), the printing job is sent to the following URL.

HTTP://Hostname/DFE/VirtualPrinterA

Thus, the application 12 selects the RIP engine 59 by designating the individual job receiving unit 64.

[Information Indicating "Pass Through Mode" Given by "A" Individual Job Receiving Unit]

In order to create raster data using the undisclosed attributes with respect to the DFE 32, the "A" individual job receiving unit 64a adds information indicating the "Pass Through Mode" to the printing job. The information for accessing the JDF can be set by the job controlling unit 55 based on the information indicating the "Pass Through Mode".

FIG. 10 is an illustration diagram showing an example of a frame format of the information indicating "Pass Through Mode" in the printing job given by "A" individual job receiving unit 64a. A vale "PassThrough" of an attribute "Mode" in a InterpetingParams tag described in the third line is the information indicating "Pass Through Mode" given by "A" individual job receiving unit 64a.

Additionally, although the information indicating "Pass Through Mode" is included in the JDF in FIG. 10, the information indicating "Pass Through Mode" may be created separately from the JDF and added as a file or the like to the JDF.

Also, the "A" individual job receiving unit 64a adds the "RIP Engine Identification Information" so that the RIP controlling unit 58 can select the RIP engine 59 of "A", though it is omitted in FIG. 10.

[JDF and Determination of Manufacturer of Application Having Created JDF]

The JDF is described in XML (Extensible Markup Language). The XML is a standard of structured text for structuring a document using tags which have specific meanings.

FIGS. 11A, 11B, and 11C are illustration diagrams respectively illustrating examples of a part of the description in the JDF. FIG. 11A shows an example of a part of the JDF created by the application 12 of "C". Instructions on the printing job are described in the JDF.

"JDF xmlns="http://www.CIP4.org/JDFSchema_1_1"" indicates that the JDF ticket is in compliance with CIP4.

"xmlns:C="www.ccc.com/schema/ccc"" indicates tag definition not in compliance with CIP4, that has been independently extended by a print business operator/Vender. In this example, tags started with "C:" are all extended tags.

"ResourcePool" indicates a definition of a group of the attributes to perform printing.

"LayoutPreparationParams" is one of the attributes defined by the "ResourcePool", defining attributes related to the imposition.

"ResourceLinkPool" indicates the definition of a group of references to attributes in the "ResourcePool", where the attributes are commonly used within a specific range in the job, such as a range between pages, in which different attributes are used, or the like.

"ComponentLink" is a definition of a reference in the "ResourceLinkPool", indicating reference to the attributes related to output subjects and information thereof.

"Amount" indicates number of print copies.

"Rotate" indicates a rotation angle of the image.

FIG. 11B shows an example of the JDF and an extension of "A". FIG. 11C shows an example of the JDF and an extension of "B". In FIG. 11B "xmlns:A="www.aaa.com/schema/aaa"" indicates that tags in the JDF starting with "A:" are all extended tags of "A". In FIG. 11C "xmlns:B="www.bbb.com/schema/bbb"" indicates that tags in the JDF starting with "B:" are all extended tags of "B".

Therefore, the JDF analyzing unit 56 can determine the manufacturer of the application 12 having created the JDF with reference to such description in the JDF. The JDF can be converted into the "Job Attribute in DFE" which can be handled by the DFE 32 of "C", using a conversion table 66 (described later), corresponding to the manufacturer of the application 12.

Also, in a case where the "RIP Engine Identification Information" is included in the JDF, the JDF is converted into the "Job Attribute in DFE" which can be handled by the DFE 32 of "C" by using the conversion table 66 corresponding to the application 12 indicated by the "RIP Engine Identification Information", without performing the above described analysis.

[Creation of Job Attribute in DFE]

Figure 13A:
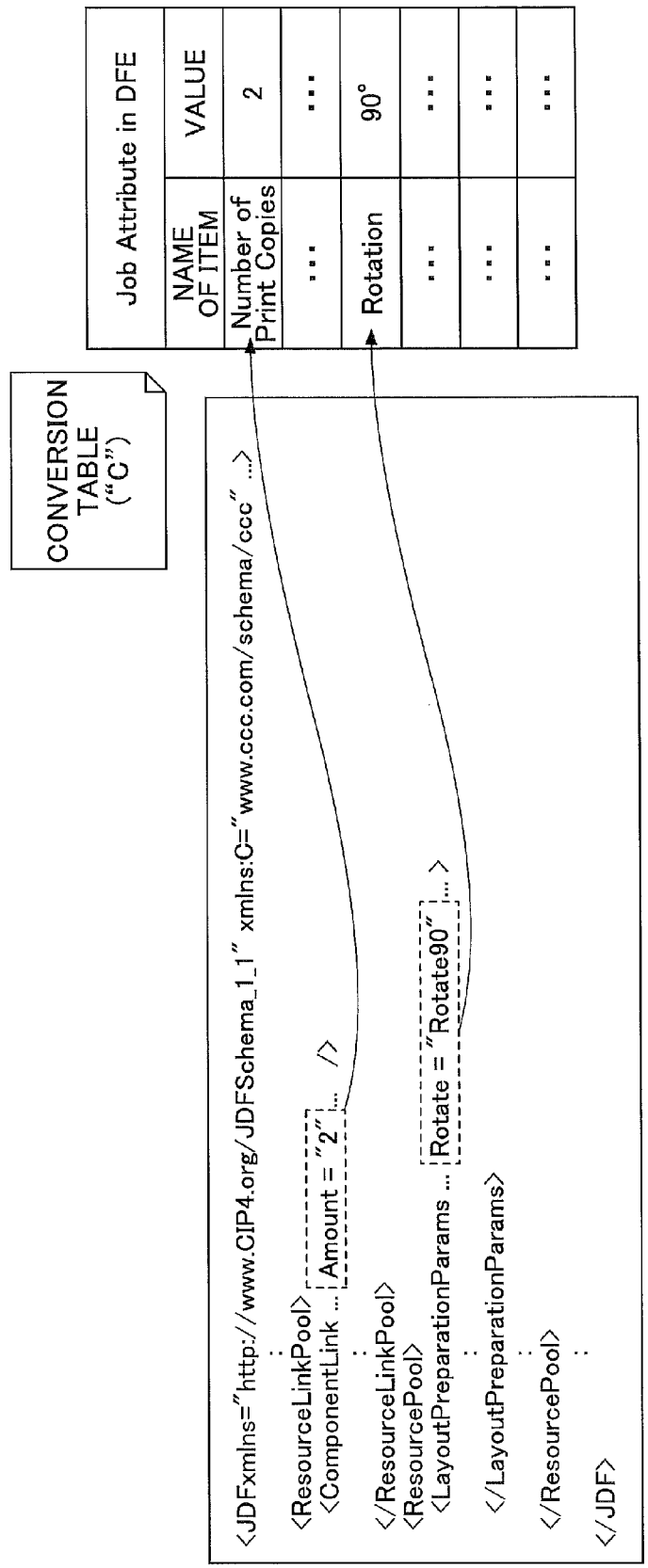
FIG. 13A is an illustration diagrams for illustrating creation of the "Job Attribute in DFE"
Figure 13B:
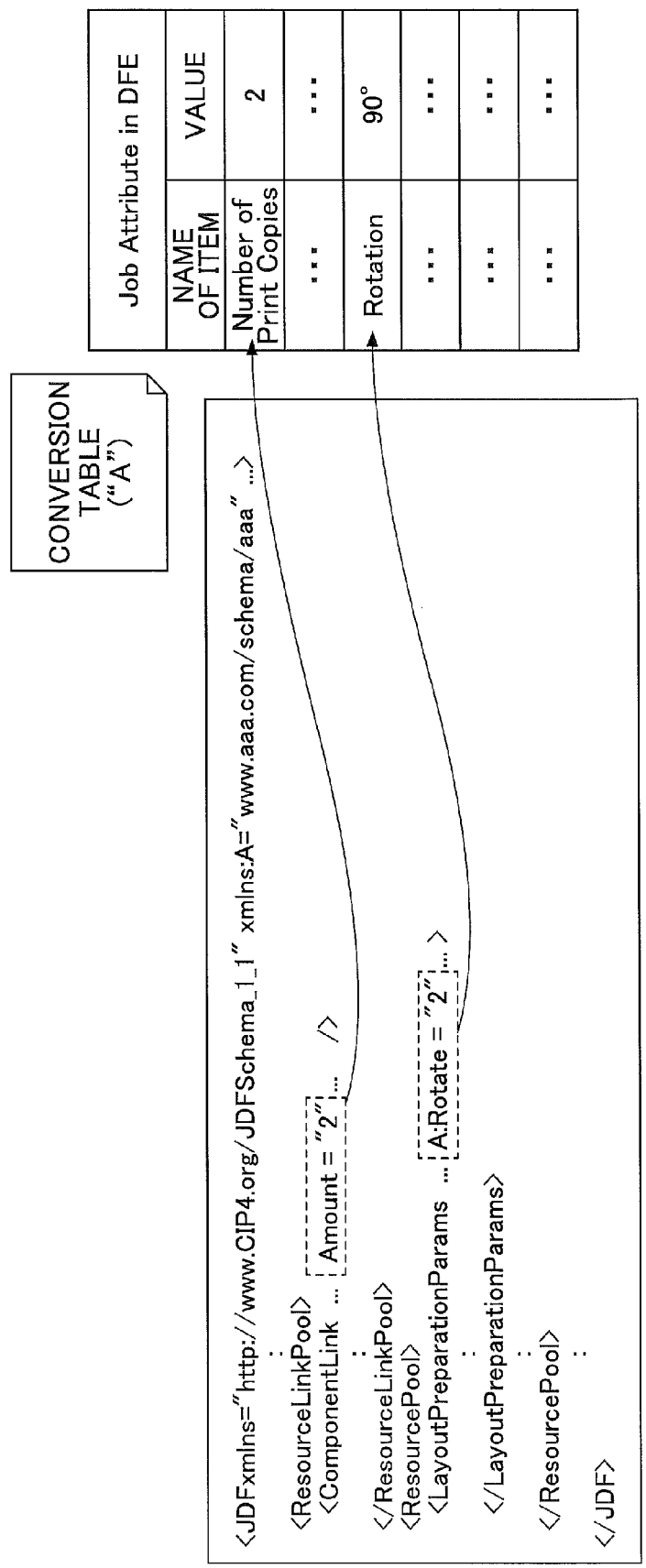
FIG. 13B is another illustration diagrams for illustrating creation of the "Job Attribute in DFE"
Figure 13C:
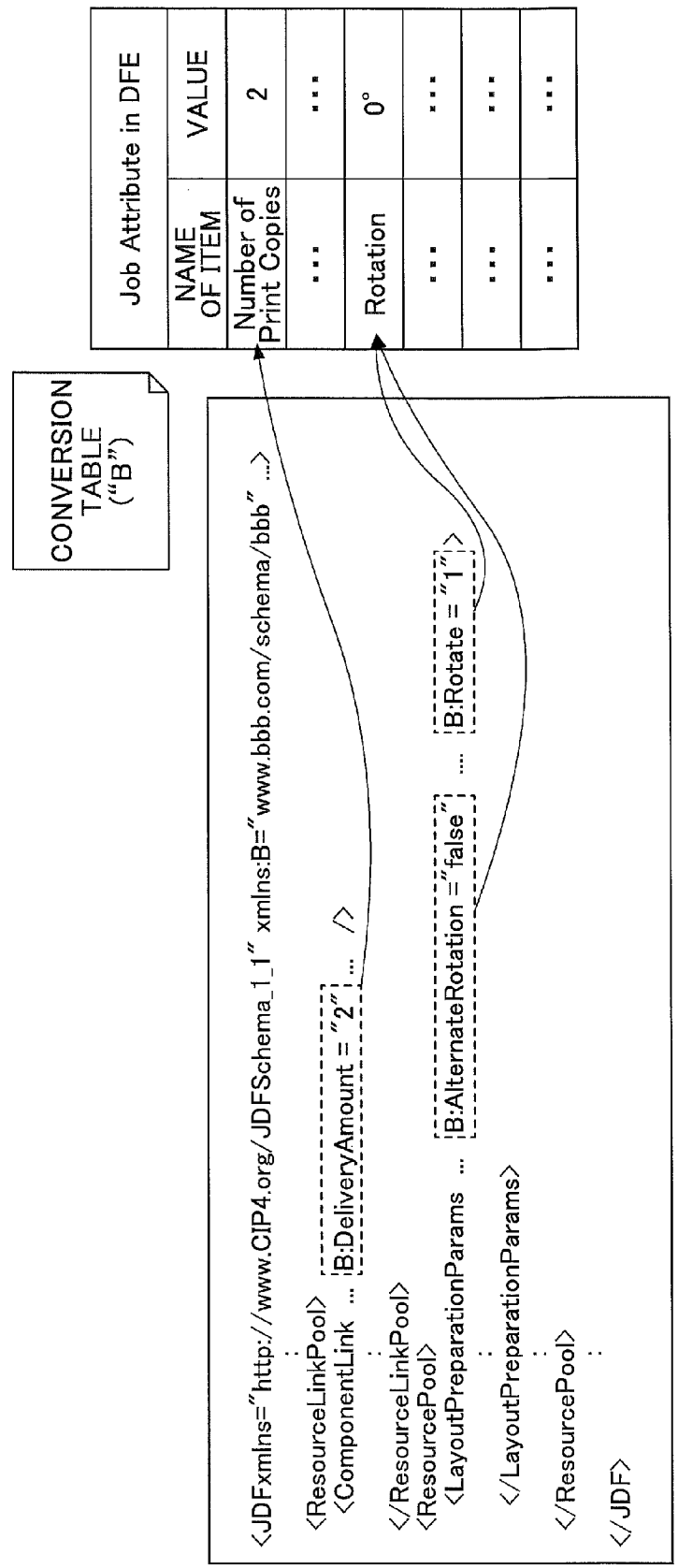
FIG. 13C is another illustration diagrams for illustrating creation of the "Job Attribute in DFE"

In the following, creation of the "Job Attribute in DFE" will be described with reference to FIGS. 12A, 12B and 12C, and FIGS. 13A, 13B and 13C. FIGS. 12A, 12B, and 12C are illustration diagrams illustrating an example of a conversion table 66. FIGS. 13A, 13B and 13C are illustration diagrams for illustrating creation of the "Job Attribute in DFE". Additionally, in a case where the "Pass Through Mode" is set in the JDF, the "Job Attribute in DFE" is not created since the job controlling unit 55 does not send the JDF to the JDF analyzing unit 56 in this case. Therefore, the "Job Attribute in DFE" is created only when the "Pass Through Mode" is not set in the JDF.

The JDF analyzing unit 56 converts the JDF, using the conversion table 66 corresponding to the manufacturer of the application 12 having created the JDF, into the "Job Attribute in DFE". In a case where the manufacturer of the application 12 having created the JDF cannot be determined, JDF is converted, by using every conversion table 66, into the "Job Attribute in DFE". In this case, the "Job Attribute in DFE" for every RIP engine 59 is created.

FIG. 12A is an illustration diagram illustrating an example of a conversion table 66 of "C". In the conversion table 66 of "C", a value of an attribute named "Amount" corresponds to a value of an item named "Number of Print Copies" while a value of an attribute named "Rotate" corresponds to a value of an item named "Rotation".

As shown in FIGS. 13A, 13B and 13C, the JDF is converted in a manner where the values of the attributes are used as the values of items in the "Job Attribute in DFE" with reference to the conversion table for correlating the attributes of the tags in the JDF with the items in "Job Attribute in DFE".

The JDF analyzing unit 56 includes not only the conversion table 66 of "C" but also the conversion table 66 of "A" and the conversion table 66 of "B". FIG. 12B is an illustration diagram illustrating an example of a conversion table 66 of "A". FIG. 12C is an illustration diagram illustrating an example of a conversion table 66 of "B". As described above, the JDF analyzing unit 56 detects a description indicating the extended tags in the JDF to determine the manufacturer of the application 12, thereby selecting the conversion table corresponding to the manufacturer.

The JDFs of "A" and "B" can be also converted similarly. In the conversion table 66 of "A", a value of an attribute named "A:Amount" corresponds to a value of an item named "Number of Print Copies" while a value of an attribute named "A:Rotate" corresponds to a value of an item named "Rotation". In the conversion table 66 of "B", a value of an attribute named "B:DeliveryAmount" corresponds to a value of an item named "Number of Print Copies" while a value of an attribute named "Rotate" corresponds to a value of an item named "Rotation". Additionally, in the conversion table 66 of "B", operation of rotation is valid only in a case where a value of an attribute named "B:AlternateRotation" is "False". Therefore, when determined as the JDF of "A" or JDF of "B" by the JDF analyzing unit 56, the "Job Attribute in DFE" can be created similarly to the case of the JDF of "C".

Additionally, when the JDF analyzing unit 56 determines that a format related to aggregation print in the printing job is described by an application 12 of a manufacturer other than own manufacture (manufacturer "C"), the JDF analyzing unit 56 sets the "Sheet Mode" at an item named "RIP Control MODE" in the "Job Attribute in DFE". When the application 12 is own (of "C") application, or a format related to aggregation print in the printing job is described in the same manner as described by the own application 12, the "Page Mode" is set at the item named "RIP Control MODE". Therefore, the RIP controlling unit 58 can control the RIP commands to output to the RIP engines 59, with reference to the "RIP Control MODE".

FIG. 14 is an illustration diagram illustrating an example of a "Job Attribute in DFE". The "Job Attribute in DFE" is broadly divided into "Job Information", which is related to execution of the job; "Edit Information", which is related to the raster data; and "Finishing Information", which is related to finishing processes.

The "Job Information" includes an item of "Number of Print Copies" for indicating the number of print copies.

The "Edit Information" includes an item of "Direction Information" for indicating a print direction.

An item of "Print Side Information" in the "Edit Information" indicates a print side of the sheet.

An item of "Rotation" in the "Edit Information" indicates a rotation angle of a page.

An item of "Expansion/Reduction" in the "Edit Information" indicates expansion/reduction and rates thereof.

An item of "Position of Image: Offset" in the "Edit Information" indicates an offset of the image.

An item of "Position of Image: Position Adjusting Information" in the "Edit Information" indicates a position adjusting of the image.

An item of "Layout Information: Custom•Imposition" in the "Edit Information" indicates custom imposition.

An item of "Layout Information: number of pages" in the "Edit Information" indicates the number of the pages in one sheet.

An item of "Layout Information: Imposition Information" in the "Edit Information" indicates information related to imposition.

An item of "Layout Information: Page Order Information" in the "Edit Information" indicates Order in which the pages are printed.

An item of "Layout Information: Creep position Adjustment" in the "Edit Information" indicates information related to creep position adjustment.

An item of "Margin Information" in the "Edit Information" indicates information related to margins such as a fitting box, or a gutter.

An item of "Crop•Mark Information: Center•Crop•Mark Information" in the "Edit Information" indicates information related to center•crop•mark.

An item of "Crop•Mark Information: Corner•Crop•Mark Information" in the "Edit Information" indicates information related to corner•crop•mark.

An item of "Collate Information" in the "Finishing Information" indicates whether a document is of a printed page basis or a document basis in a case where a plurality of copies of the document are printed.

An item of "Staple/Bind Information" in the "Finishing Information" indicates information related to staple/bind.

An item of "Punch Information" in the "Finishing Information" indicates information related to punching.

An item of "Folding Information" in the "Finishing Information" indicates information related to folding.

An item of "Trim" in the "Finishing Information" indicates information related to trim.

An item of "Output Tray Information" in the "Finishing Information" indicates information related to an output tray.

An item of "Input Tray Information" in the "Finishing Information" indicates information related to an input tray.

An item of "Cover•Sheet Information" in the "Finishing Information" indicates information related to a cover•sheet.

Also, as described in FIG. 14, "RIP Control Mode" is set in the "Job Attribute in DFE". The "Page Mode" or the "Sheet Mode" is set in the "RIP Control Mode". Additionally, in the dummy JDF, the "Page Mode" is set in the "RIP Control Mode".

[RIP Parameter List]

FIG. 15 is an illustration diagram illustrating an example of the "RIP Parameter List". FIG. 15 shows an example of the "RIP Parameter List" created based on the PDL and the "Job Attribute in DFE".

"Input/Output Data Type Information" indicates types of input data and output data (input data and output data indicates not only the PDL but also text files or JPEG image data).

"Input/Output Data Read/Write position designation Information" indicates a method for designating the offset of input data and output data (read position/write position). For example, "from designated position", "from current position", "from tail end", etc., are indicated.

"Input/Output Data Read/Write position Information" indicates a current processing position of input data and output data.

"Input/Output Data Read/Write Execution Mode Information" indicates modes of execution. For example, "READ", "WRITE", "READ_WRITE", etc., are indicated.

"Measurement Unit Information (Dimension)" indicates measurement units used in the "RIP Parameter List". For example, "mm", "inch", "pel", "point", etc., are indicated.

"Input/Output Data Compression Method Information" indicates methods for compressing input data and output data. For example, "UNCOMPRESSED", "PACKBITS", etc., are indicated.

"RIP Control Mode" indicates control modes of the aggregation print. For example, "Page Mode" or "Sheet Mode" is indicated.

"Input/Output Image Information Part" includes "Information Related to Output Image", "Information Related to Input Image", and "Information Related to Operation of Image".

"Image Format•Type" indicates the types of format of the output images. For example, "Raster", etc., are indicated.

"Image Format•Dimension" indicates dimensions of the output image format.

"Image Format•Resolution" indicates resolution of the output image format.

"Position of Image" indicates a position of the output image.

"Color Separation Information" indicates color separation (color decomposition). For example, "k", "cymk", "separation", etc., are indicated.

"Color Plane•Fit•Policy Information" indicates methods for operating color planes.

"Plane Shift Information" indicates the amount of shift of the color plane.

"Number of Bits in Image Format" indicates the number of bits in the output image format.

"Image Direction Information" indicates the directions of the page of the output image.

"Image Formation Position Information" indicates the position information of the crop•area.

"Image Formation Size Information" indicates the size information of the crop•area.

"Image Formation Method Information" indicates the policy of clip.

"Color ICC Information" indicates the information related to color ICC profiles.

"Font Replacement Information" indicates the information related to font replacement.

"Image Formation Basic Point Information" indicates the basic points of the image formation. For example, "Center", "Top Right", etc., are indicated.

"Flat K Black Information" indicates the information related to flat K black".

"Rendering Information" indicates the information related to the rendering (rasterize).

"Image Format•Type" indicates the types of format of the input image. For example, "Raster", etc., are indicated.

"Image Format•Dimension" indicates the dimensions of the input image format.

"Image Format•Resolution" indicates the resolution of the input image format.

"Position of Image" indicates the positions of the input image.

"Input Data" indicates the input data.

"Page Range Information" indicates page numbers.

"Color ICC Information" indicates the information related to color ICC profiles.

"Scaling•Offset Information" indicates the offsets of expansion/reduction algorithm. For example, "Horizontal Offset", "Vertical Offset", etc., are indicated.

"Object•Area Information" indicates the width and the height of the object area.

"Halftone Information" indicates the offsets of the halftone. For example, "Horizontal Offset", "Vertical Offset", etc., are indicated.

"Scaling Algorithm Information" indicates the methods of scaling.

"Information Related to PDL" Includes "Data Area", "Size Information", and "Data Arrangement Method".

The "Data Area" indicates the information of the area storing the PDL. Font information, information of number of the pages, etc., are included in the PDL stored in the area.

The "Size Information" indicates the size of the PDL.

"Data Arrangement Method" indicates the arrangement method of data. For example, "Little Endian", "Big Endian", etc., are indicated.

<"RIP Parameter List" of the printing job in which the "Pass Through Mode" is set.>

In the following, the "RIP Parameter List" created by the job controlling unit 55 based on the PDL and the JDF where the "Pass Through Mode" is set in the printing job will be described. The "Pass Through Mode" is an example of the operation mode in the claims.

FIG. 16 is an illustration diagram showing an example of the "RIP Parameter List" in a case where the "Pass Through Mode" is set in the printing job. The attributes, which are not disclosed by the application 12 to the DFE 32, can be included in the "RIP Parameter List" by creating the "RIP Parameter List" directly based on the PDL and the JDF.

In a case where the "Pass Through Mode" is set in the printing job, first, the "Pass Through Mode" is set in the "RIP Control Mode".

Further, the job controlling unit 55 sets values of the JDF as well as information created based on the PDL in the following items of the "RIP Parameter List".

"Input/Output Data Type Information";

"Input/Output Data Read/Write position designation Information";

"Input/Output Data Read/Write position Information"; and

"Input/Output Data Read/Write Execution Mode Information".

That is, information for accessing the JDF is set in these items so that the RIP engine 59 can retrieve the JDF. For example, types of data of the JDF (such as text or XML) are set in the "Input/Output Data Type Information"; the "from designated position" is set in the "Input/Output Data Read/Write position designation Information"; top address of the JDF is set in the "Input/Output Data Read/Write position Information"; and "READ" (indicates reading) is set in the "Input/Output Data Read/Write Execution Mode Information".

Thus, the RIP engine 59 of "A" can retrieves the undisclosed attributes with respect to the DFE 32 by referring the "RIP Parameter List" to access the JDF.

[Operation Flow]

In the following, an operation flow of the print system 200, being divided into a case where the information indicating the "Pass Through Mode" is set and a case where the information indicating the "Pass Through Mode" is not set, will be described.

FIG. 17 is a sequence diagram illustrating an example of the operation flow to process the printing job in a case where the "Pass Through Mode" is not set.

In step S1, the application 12 requests the device information communicating unit 63 of the DFE 32 the device information.

In step S2, the device information communicating unit 63 requests the device information managing unit 62 the device information.

In step S3, the device information managing unit 62 outputs the device information being managed to the device information communicating unit 63.

In step S4, the device information communicating unit 63 sends the device information to the application 12.

In step S5, the job sending unit 72 of the application 12 determines the individual job receiving unit 64 to be designated based on the device information.

In step S6, the job sending unit 72 of the application 12 sends the printing job (JDF+PDL) to the job receiving unit 51 of the DFE 32.

In step S7, the job receiving unit 51 outputs the printing job to the individual job receiving unit 64.

In step S8, the individual job receiving unit 64 corrects the received JDF using the dummy JDF corresponding to the included RIP engine 59. Additionally, this step may not be performed.

In step S9, the individual job receiving unit 64 outputs the printing job to the system controlling unit 52.

In step S10, the system controlling unit 52 outputs the printing job to the job controlling unit 55.

In step S11, the job controlling unit 55 outputs the JDF with a JDF conversion request to the JDF analyzing unit 56.

In step S12, the JDF analyzing unit 56 determines the application 12 having created the JDF based on the "RIP Engine Identification Information", thereby creating the "Job Attribute in DFE" using the conversion table for the RIP engine expected by the application 12 to perform rendering.

In step S13, the JDF analyzing unit 56 outputs the "Job Attribute in DFE" to the job controlling unit 55.

In step S14, the job controlling unit 55 creates the "RIP Parameter List" based on the "Job Attribute in DFE" and the PDL.

Processes described below differ according to the "RIP Control Mode", which may be the "Page Mode" or the "Sheet Mode". First, a case of the "Page Mode" is described.

In step S15-1, the job controlling unit 55 outputs the "RIP Parameter List" to the RIP controlling unit 58.

In step S16-1, the RIP controlling unit 58 initializes the RIP engines 59. Additionally, the RIP controlling unit 58 selects the RIP engine 59 based on the "RIP Engine Identification Information".

In step S17-1, the job controlling unit 55 requests the RIP controlling unit 58 to execute RIP.

In step S18-1, the RIP controlling unit 58 outputs the RIP commands instead of the job controlling unit 55. The RIP controlling unit 58 outputs the RIP commands in a sequence suitable for the "Page Mode" in a case where the "RIP Control Mode" is the "Page Mode".

In step S19-1, In step S20-1, the RIP engine 59 rasterizes.

In step S20-1, the RIP engine 59 stores the raster data in the image storage unit 60.

Next, a case of the "Sheet Mode" is described.

In step S15-2, the job controlling unit 55 outputs the "RIP Parameter List" to the RIP controlling unit 58.

In step S16-2, the RIP controlling unit 58 initializes the RIP engines 59. Additionally, the RIP controlling unit 58 selects the RIP engine 59 based on the "RIP Engine Identification Information".

In step S17-2, the job controlling unit 55 requests the RIP controlling unit 58 to execute RIP.

In step S18-2, the RIP controlling unit 58 outputs the RIP commands in a sequence suitable for the "Sheet Mode" in a case where the "RIP Control Mode" is the "Sheet Mode".

In step S19-2, the RIP engine 59 rasterizes.

In step S20-2, the RIP engine 59 stores the raster data in the image storage unit 60.

Thus, operation of the job controlling unit 55 in the case of the "Sheet Mode" does not differ from that of the "Page mode" (always be operated according to the "Page Mode"). The RIP controlling unit 58, based on the "RIP Control Mode", determines the differences between the "Page Mode" and the "Sheet Mode", thereby consolidating the differences between the "Page Mode" and the "Sheet Mode".

In step S21, the job controlling unit 55 outputs the "Finishing Information" with a print execution request to the printer controlling unit 61. This may be performed before creating the raster data or after creating the raster data.

In step S22, the printer controlling unit 61, receiving the print execution request, checks the raster data stored in the image storage unit 60 to print.

Figure 18:
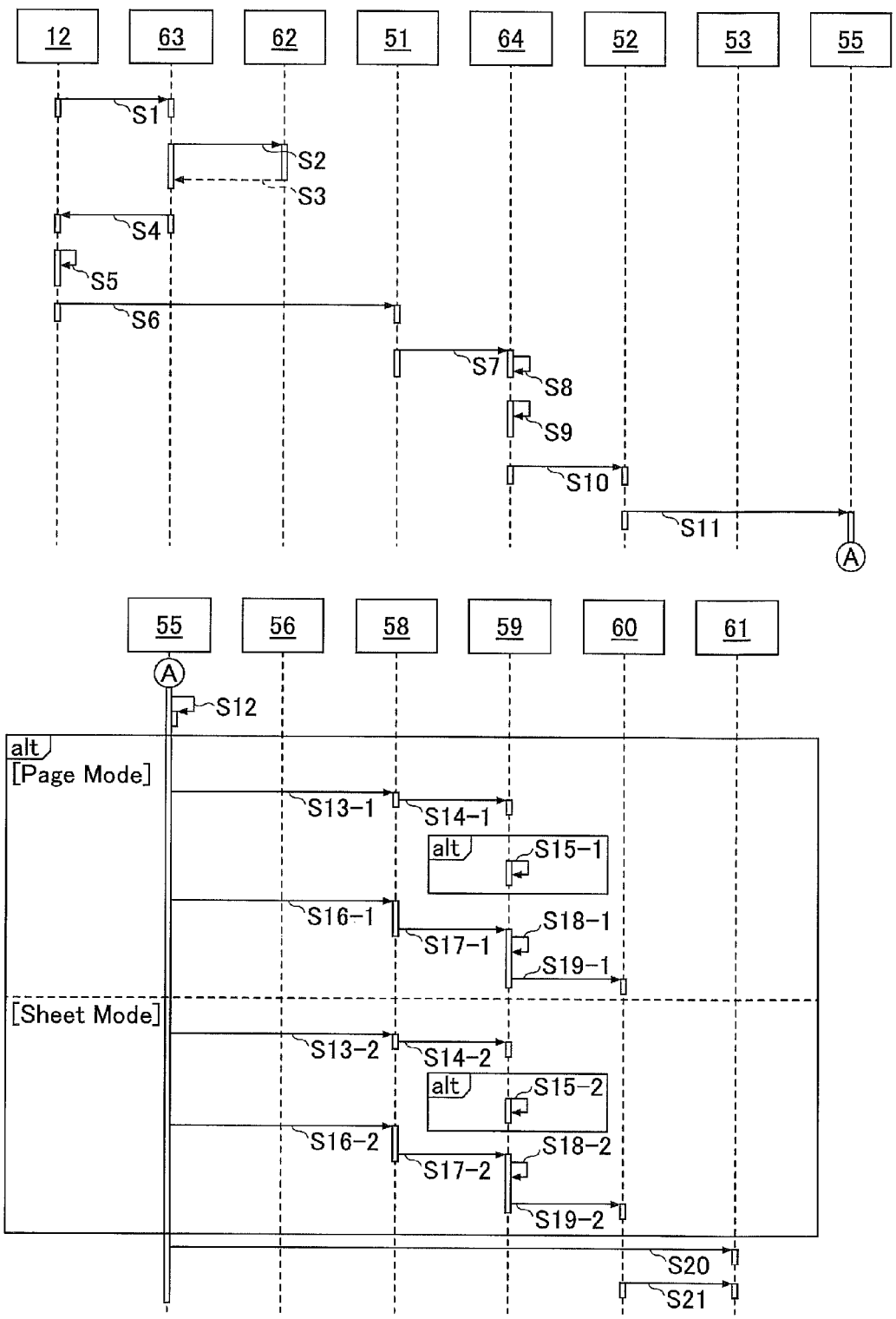
FIG. 18 is a sequence diagram illustrating an example of the operation flow to process the printing job in a case where the "Pass Through Mode" is set.

FIG. 18 is a sequence diagram illustrating an example of the operation flow to process the printing job in a case where the "Pass Through Mode" is set.

In step S1, the application 12 requests the device information communicating unit 63 of the DFE 32 the device information.

In step S2, the device information communicating unit 63 requests the device information managing unit 62 the device information.

In step S3, the device information managing unit 62 outputs the device information being managed to the device information communicating unit 63.

In step S4, the device information communicating unit 63 sends the device information to the application 12.

In step S5, the job sending unit 72 of the application 12 determines the individual job receiving unit 64 to be designated based on the device information. Here, the individual job receiving unit 64 which accepts the "Pass Through Mode" is selected.

In step S6, the job sending unit 72 of the application 12 sends the printing job (JDF+PDL) to the job receiving unit 51 of the DFE 32.

In step S7, The job receiving unit 51 outputs the printing job to the individual job receiving unit 64.

In step S8, the individual job receiving unit 64 sets the "Pass Through Mode" in the printing job addressed to the individual job receiving unit 64 itself.

In step S9, the individual job receiving unit 64 corrects the received JDF using the dummy JDF corresponding to the included RIP engine 59. Additionally, this step may not be performed.

In step S10, the individual job receiving unit 64 outputs the printing job (JDF+PDL+"Pass Through Mode") to the system controlling unit 52.

In step S11, the system controlling unit 52 outputs the printing job (JDF+PDL+"Pass Through Mode") to the job controlling unit 55.

In step S12, the job controlling unit 55 creates the "RIP Parameter List" based on the JDF and the PDL.

That is, the "Page Mode" or the "Sheet Mode" and the "Pass Through Mode" are set in the "RIP Control Mode". Also, the information for accessing the JDF is set in the "RIP Parameter List".

Processes described below differ according to the "RIP Control Mode", which may be the "Page Mode" or the "Sheet Mode". First, a case of the "Page Mode" is described.

In step S13-1, the job controlling unit 55 outputs the "RIP Parameter List" to the RIP controlling unit 58.

In step S14-1, the RIP controlling unit 58 initializes the RIP engine 59. Additionally, the RIP controlling unit 58 selects the RIP engine 59 based on the "RIP Engine Identification Information".

In step S15-1, the RIP engine 59 retrieves the JDF to analyze it with reference to the information for accessing the JDF included in the "RIP Parameter List" since the "Pass Through Mode" is set in the "RIP Parameter List". Thus, the undisclosed attributes with respect to the DFE 32 can be retrieved from the JDF.

In step S16-1, the job controlling unit 55 requests the RIP controlling unit 58 to execute RIP.

In step S17-1, the RIP controlling unit 58 outputs the RIP commands instead of the job controlling unit 55. The RIP controlling unit 58 outputs the RIP commands in a sequence suitable for the "Page Mode" in a case where the "RIP Control Mode" is the "Page Mode".

In step S18-1, the RIP engine 59 rasterizes.

In step S19-1, the RIP engine 59 stores the raster data in the image storage unit 60.

Next, a case of the "Sheet Mode" is described.

In step S13-2, the job controlling unit 55 outputs the "RIP Parameter List" to the RIP controlling unit 58.

In step S14-2, the RIP controlling unit 58 initializes the RIP engine 59. Additionally, the RIP controlling unit 58 selects the RIP engine 59 based on the "RIP Engine Identification Information".

In step S15-2, the RIP engine 59 retrieves the JDF to analyze it with reference to the information for accessing the JDF included in the "RIP Parameter List" since the "Pass Through Mode" is set in the "RIP Parameter List". Thus, the undisclosed attributes with respect to the DFE 32 can be retrieved from the JDF.

In step S16-2, the job controlling unit 55 requests the RIP controlling unit 58 to execute RIP.

In step S17-2, the RIP controlling unit 58 outputs the RIP commands in a sequence suitable for the "Sheet Mode" in a case where the "RIP Control Mode" is the "Sheet Mode".

In step S18-2, RIP engine 59 rasterizes.

In step S19-2, the RIP engine 59 stores the raster data in the image storage unit 60.

In step S20, the job controlling unit 55 outputs the "Finishing Information" with a print execution request to the printer controlling unit 61. This may be performed before creating the raster data or after creating the raster data.

In step S21, the printer controlling unit 61, receiving the print execution request, checks the raster data stored in the image storage unit 60 to print.

As described above, in the DFE 32 of the present embodiment which includes the individual job receiving unit 64 corresponding to the respective RIP engines 59, the application 12 can send the printing jobs designating the individual job receiving unit 64. Also, even if the undisclosed attributes with respect to the DFE 32 are set in the printing jobs, the RIP engine 59 can analyze the JDF thereby reflecting the undisclosed attributes in the raster data since the individual job receiving unit 64 sets the "Pass Through Mode" in the printing jobs and the information for accessing the JDF is included in the "RIP Parameter List"s.

[Suitable Variations]

Herein above, although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

For example, although the DFE 32 has all the functions in FIG. 7, these functions may be distributed to separate devices which can communicate with each other through the network 3. For example, the RIP engines 59 and the JDF analyzing unit 56 may be disposed in the network which can be accessed by the DFE 32.

Similarly, the image storage unit 60 or the job data storage unit 53 may be disposed in the network which can be accessed by the DFE 32.

Also, the device information managing unit 62 or device information communicating unit 63 may be included in devices, other than the DFE 32, disposed in the network.

The present application is based on Japanese Priority Application No. 2014-047217 filed on Mar. 11, 2014, and Japanese Priority Application No. 2015-033947 filed on Feb. 24, 2015, the entire contents of which are hereby incorporated herein by reference.

What is claimed is:

1. An information processing apparatus capable of communicating with a plurality of Raster Image Processing (RIP) engines, each associated with a different manufacturer that implements different extensions to Job Definition Format (JDF), for creating drawing data used for forming an image in a printing device, wherein a printing job includes a printing process instruction file in JDF and default printing process instruction files for defining values of attributes that are set in a printing process instruction file of the printing job in advance, the default printing process instruction files being provided in accordance with the RIP engines, the information processing apparatus comprising:
a job receiving unit configured to receive the printing job designating a RIP engine of the RIP engines, the RIP engine creating the drawing data by using the printing job, wherein the job receiving unit corrects the printing process instruction file of the received printing job based on the default printing process instruction files in accordance with the designation of the RIP engine; and
a job controlling-unit configured to output the printing job received by the job receiving unit to the designated RIP engine.

2. The information processing apparatus as claimed in claim 1, wherein the job receiving unit adds operation mode designation information for designating a certain operation of the drawing data creation to the received printing job, the job outputting unit outputs the operation mode designation information with the printing job to the designated RIP engine, and
in a case where the operation mode designation information is added, the RIP engine performs the drawing data creation differently from in a case where the operation mode designation information is not added.

3. The information processing apparatus as claimed in claim 2, further comprising an analyzing unit configured to create control data for controlling the RIP engine to create the drawing data,
the analyzing unit sets information for accessing the printing process instruction file in the control data in a case where the operation mode designation information is added to the printing job, and outputs the operation mode designation information with the control data to the job controlling unit; and
the RIP engine, receiving the operation mode designation information from the printing job outputting unit, retrieves the printing process instruction file according to the information for accessing the setting information, and thereby performing the creation of the drawing data based on the retrieved printing process instruction file as the certain operation.

4. The information processing apparatus as claimed in claim 3, wherein the job receiving unit includes individual job receiving units corresponding to the RIP engines for receiving the printing job designating the RIP engines, and a unit information sending unit configured to send unit information for designating an individual job receiving unit of the individual job receiving units to an external device.

5. The information processing apparatus as claimed in claim 4, wherein the unit information includes operation mode information for indicating that the RIP engine is capable of performing the certain operation, and the individual job receiving unit corresponding to the RIP engine capable of performing the certain operation adds the operation mode designation information to the received printing job.

6. The information processing apparatus as claimed in claim 4, wherein the individual job receiving unit adds identification information for identifying the RIP engine to the received printing job, and the job outputting unit selects, based on the identification information, the RIP engine to create the drawing data based on the printing job.

7. The information processing apparatus as claimed in claim 6, wherein the individual job receiving units have the default printing process instruction files corresponding to the respective individual job receiving units, and the individual job receiving units corrects the setting information based on the default printing process instruction files and sets the default printing process instruction file in the printing job in a case where the received printing job includes no setting information.

8. An information processing system including an external device and an information processing apparatus capable of creating drawing data by using a printing job obtained from the external device, wherein a printing job includes a printing process instruction file in Job Definition Format (JDF) and default printing process instruction files for defining values of attributes that are set in a printing process instruction file of the printing job provided in advance, the default printing process instruction files being provided in accordance with Raster Image Processing (RIP) engines,
the information processing apparatus comprising:
a plurality of RIP engines, each associated with a different manufacturer that implements different extensions to JDF, for creating drawing data by using the printing job;
individual job receiving units corresponding to the RIP engines for receiving a printing job designating a RIP engine, wherein the individual job receiving units correct the printing process instruction file of the received printing job based on the default printing process instruction files in accordance with the designation of the RIP engine;
a job outputting unit configured to output the printing job to a RIP engine of the RIP engines corresponding to an individual job receiving unit of the individual job receiving units; and
a unit information sending unit configured to send unit information for designating the individual job receiving unit to the external device,
the external device comprising:
a job sending unit configured to send the printing job designating the RIP engine, based on the unit information, to individual job receiving unit corresponding to the designated RIP engine.

9. A non-transitory computer-readable recording medium having stored therein a program for causing a computer to serve as an information processing apparatus capable of creating drawing data by using a printing job obtained from an external device, wherein a printing job includes a printing process instruction file in Job Definition Format (JDF) and default printing process instruction files for defining values of attributes that are set in a printing process instruction file of the printing job provided in advance, the default printing process instruction files being provided in accordance with Raster Image Processing (RIP) engines, each associated with a different manufacturer that implements different extensions to JDF, the information processing apparatus performing the steps of:

receiving the printing job designating a RIP engine of the RIP engines, the RIP engine creating the drawing data by using the printing job;

storing default printing process instruction files for defining values of attributes that are set in the printing process instruction file of the printing job in advance, the default printing process instruction files be provided in accordance with the RIP engines;

correcting the printing process instruction file of the received printing job based on the default printing process instruction files in accordance with the designation of the RIP engine; and outputting the printing job, received in the step of receiving, to the designated RIP engine.

* * * * *